US010313042B2

(12) United States Patent
Choi et al.

(10) Patent No.: US 10,313,042 B2
(45) Date of Patent: Jun. 4, 2019

(54) MOBILE COMMUNICATION SYSTEM AND DATA TRANSMISSION METHOD THEREOF

(75) Inventors: Seung Hoon Choi, Gyeonggi-do (KR); Young Bum Kim, Seoul (KR); Joon Young Cho, Gyeonggi-do (KR); Hyoung Ju Ji, Seoul (KR)

(73) Assignee: Samsung Electronics Co., Ltd. (KR)

( * ) Notice: Subject to any disclaimer, the term of this patent is extended or adjusted under 35 U.S.C. 154(b) by 13 days.

(21) Appl. No.: 14/002,489

(22) PCT Filed: May 17, 2012

(86) PCT No.: PCT/KR2012/003873
§ 371 (c)(1),
(2), (4) Date: Aug. 30, 2013

(87) PCT Pub. No.: WO2012/165782
PCT Pub. Date: Dec. 6, 2012

(65) Prior Publication Data
US 2013/0336300 A1 Dec. 19, 2013

(30) Foreign Application Priority Data

May 30, 2011 (KR) .................. 10-2011-0051309

(51) Int. Cl.
*H04J 3/16* (2006.01)
*H04L 1/18* (2006.01)
(52) U.S. Cl.
CPC .......... *H04J 3/1694* (2013.01); *H04L 1/1861* (2013.01); *H04L 1/1893* (2013.01)
(58) Field of Classification Search
CPC ... H04L 1/1861; H04L 1/1893; H04L 1/1812; H04J 3/1694
See application file for complete search history.

(56) References Cited

U.S. PATENT DOCUMENTS

2009/0196239 A1\* 8/2009 Lee et al. .................. 370/329
2009/0274078 A1 11/2009 Zhao et al.
(Continued)

FOREIGN PATENT DOCUMENTS

| KR | 20090092708 A | \* | 9/2009 |
| WO | WO 2010/049587 | | 5/2010 |
| WO | WO 2011/077288 | | 6/2011 |

OTHER PUBLICATIONS

"Way Forward on LTE TDD Frame Structure"; TSG-RAN WG1 #51; R1-075020; Nov. 2007, 2 pgs.*
(Continued)

*Primary Examiner* — Ian N Moore
*Assistant Examiner* — Justin T Van Roie
(74) *Attorney, Agent, or Firm* — The Farrell Law Firm, P.C.

(57) ABSTRACT

The disclosure relates to data transmission method and apparatus for transmitting UL grant or ACK/NACK at flexible subframes in a Time Division Duplex (TDD) system. The data transmission method of a base station according to the present invention includes configuring subframes irrelevant to Hybrid Automatic Repeat reQuest (HARQ) process as flexible subframes; scheduling uplink transmission at the flexible subframes with uplink grant; receiving uplink data transmitted by a terminal at the flexible subframes as scheduled; and transmitting, when decoding the uplink data fails, HARQ acknowledgement/negative acknowledgement (ACK/NACK) or uplink grant to request retransmission of the uplink data. The data transmission method of the present invention is capable of utilizing flexible subframes for uplink transmission without influencing the uplink HARQ process associated with the downlink subframes configured as flexible subframes.

18 Claims, 14 Drawing Sheets

(56) References Cited

U.S. PATENT DOCUMENTS

| | | | |
|---|---|---|---|
| 2010/0322165 A1 | 12/2010 | Yoo | |
| 2011/0176461 A1* | 7/2011 | Astely | H04B 7/2656 |
| | | | 370/280 |
| 2012/0082101 A1* | 4/2012 | Gaal | H04W 72/1226 |
| | | | 370/329 |
| 2013/0315114 A1* | 11/2013 | Seo et al. | 370/280 |
| 2014/0098720 A1* | 4/2014 | Zeng | H04W 72/0446 |
| | | | 370/280 |
| 2014/0204961 A1* | 7/2014 | Hooli et al. | 370/476 |

OTHER PUBLICATIONS

PCT/ISA/237 Written Opinion issued on PCT/KR2012/003873 (pp. 4).
PCT/ISA/210 Search Report issued on PCT/KR2012/003873 (pp. 3).

* cited by examiner

[Fig. 3]
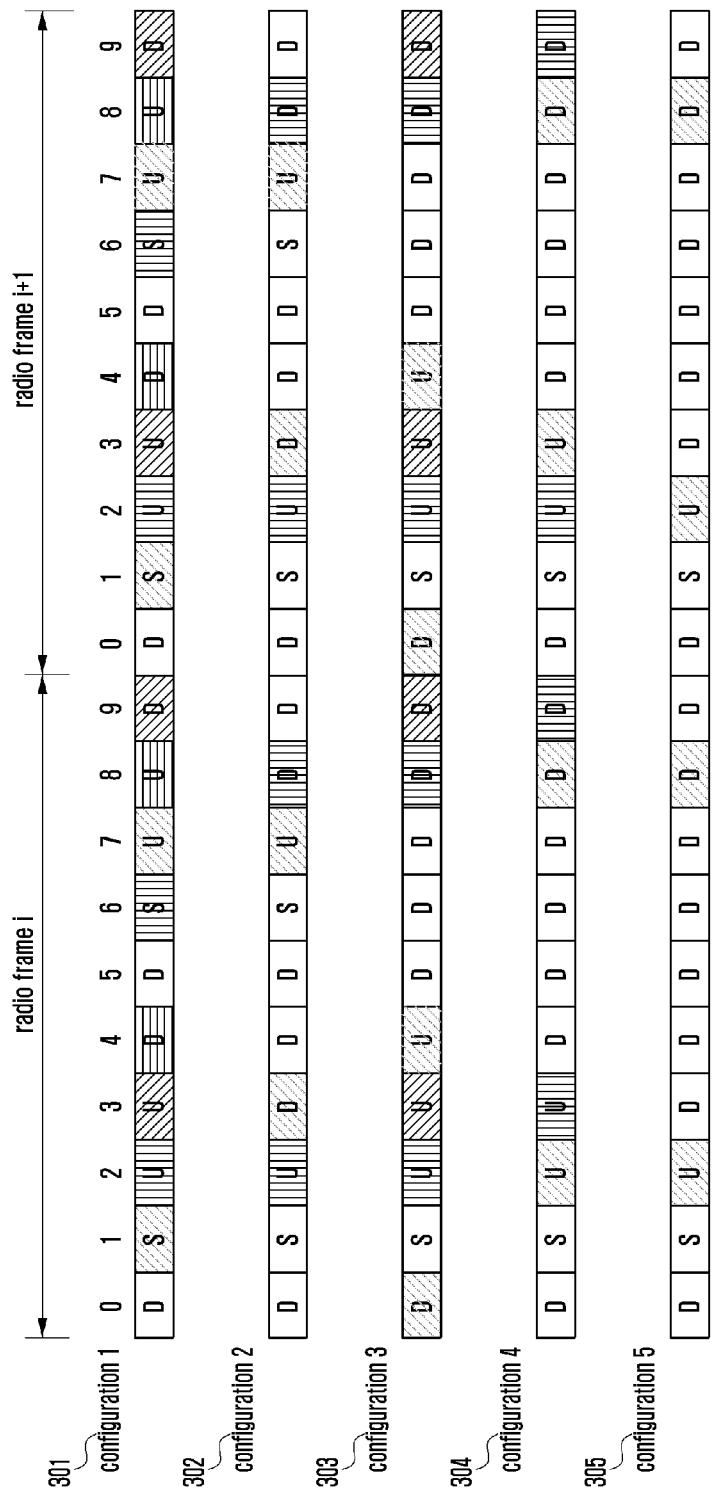

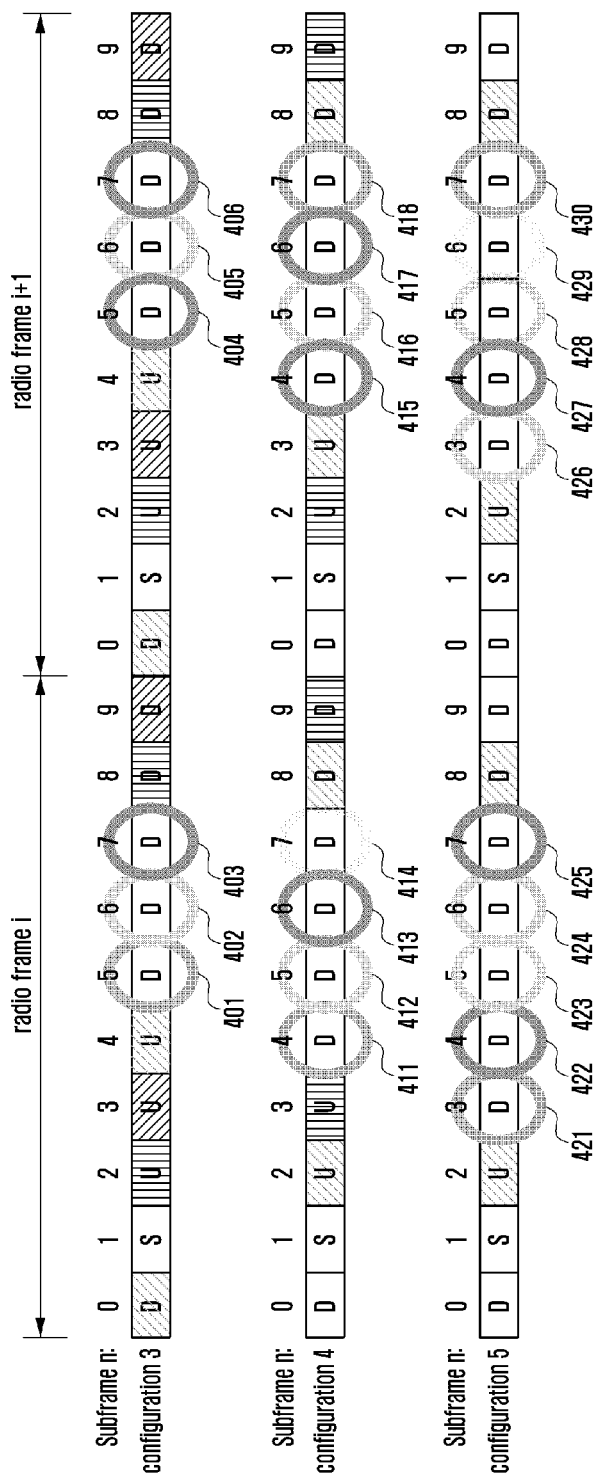
[Fig. 4]

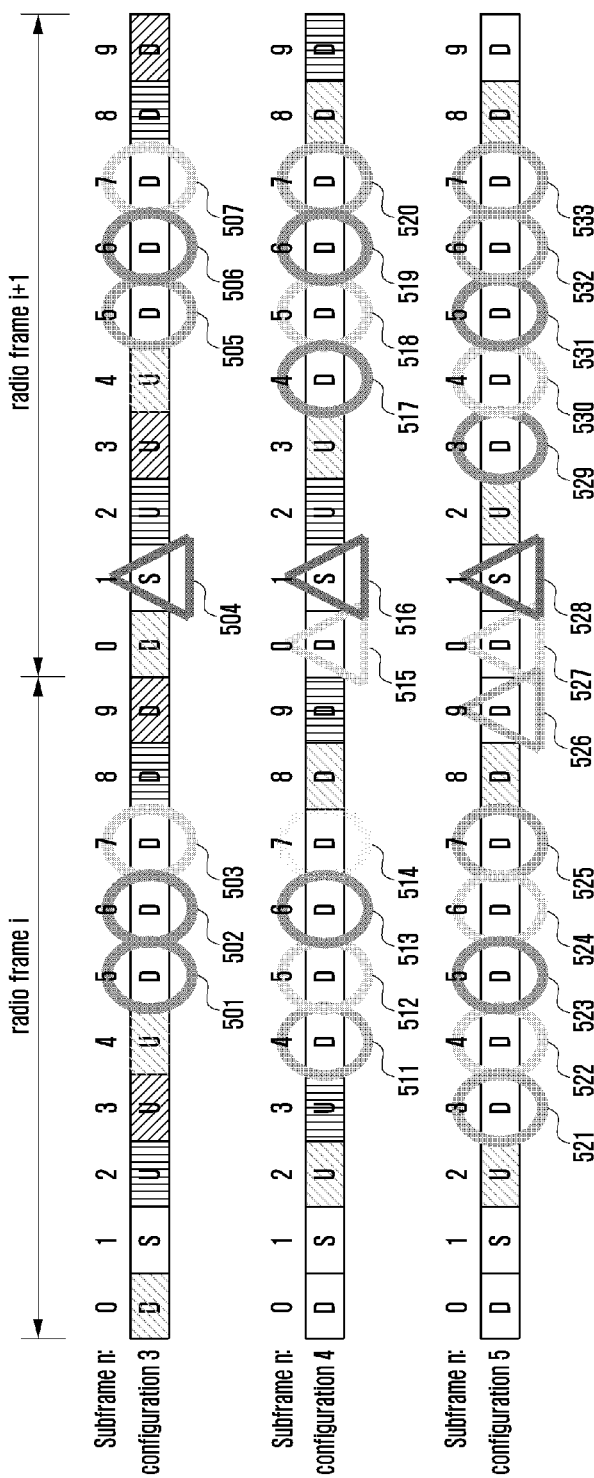
[Fig. 5]

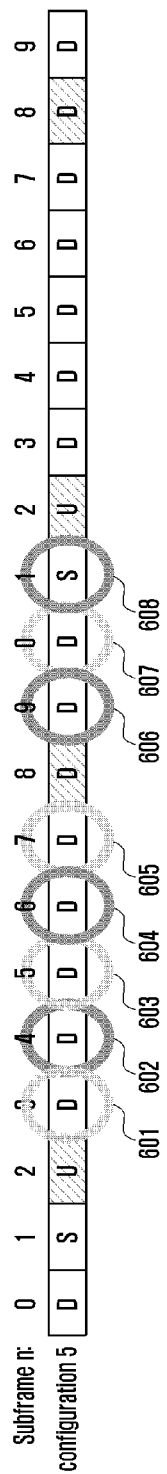
[Fig. 6]

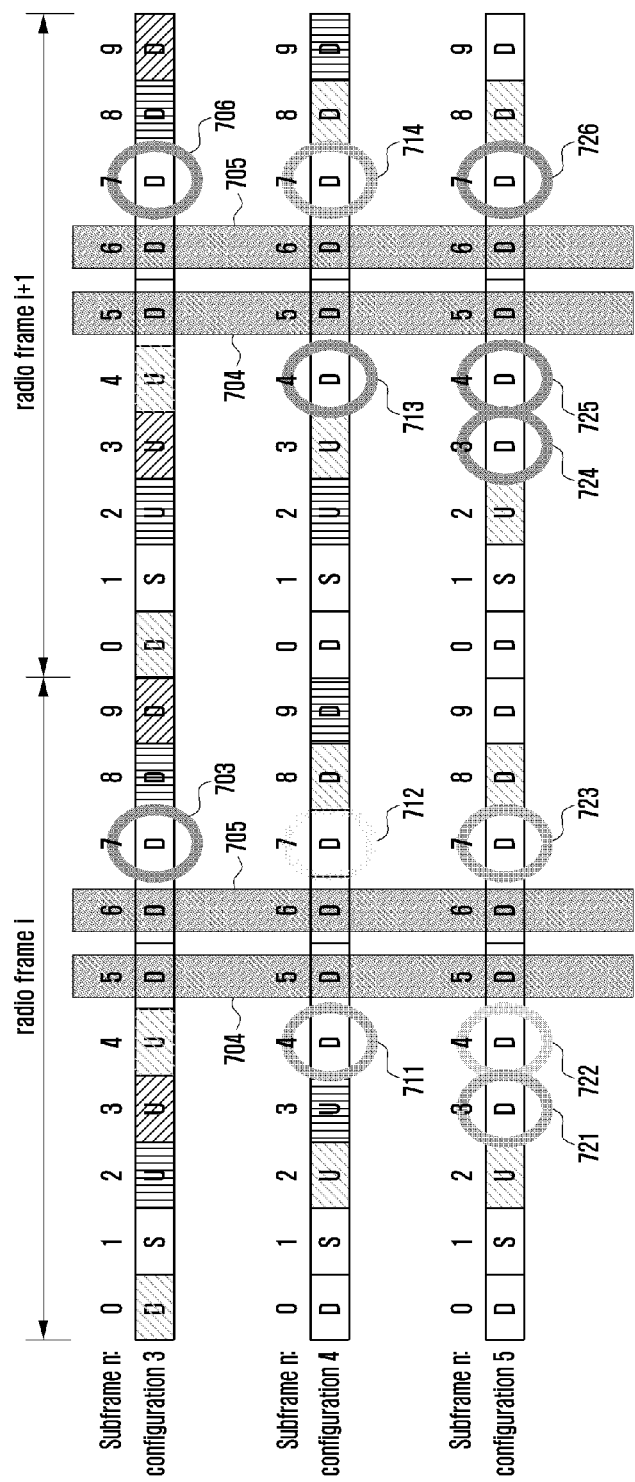
[Fig. 7]

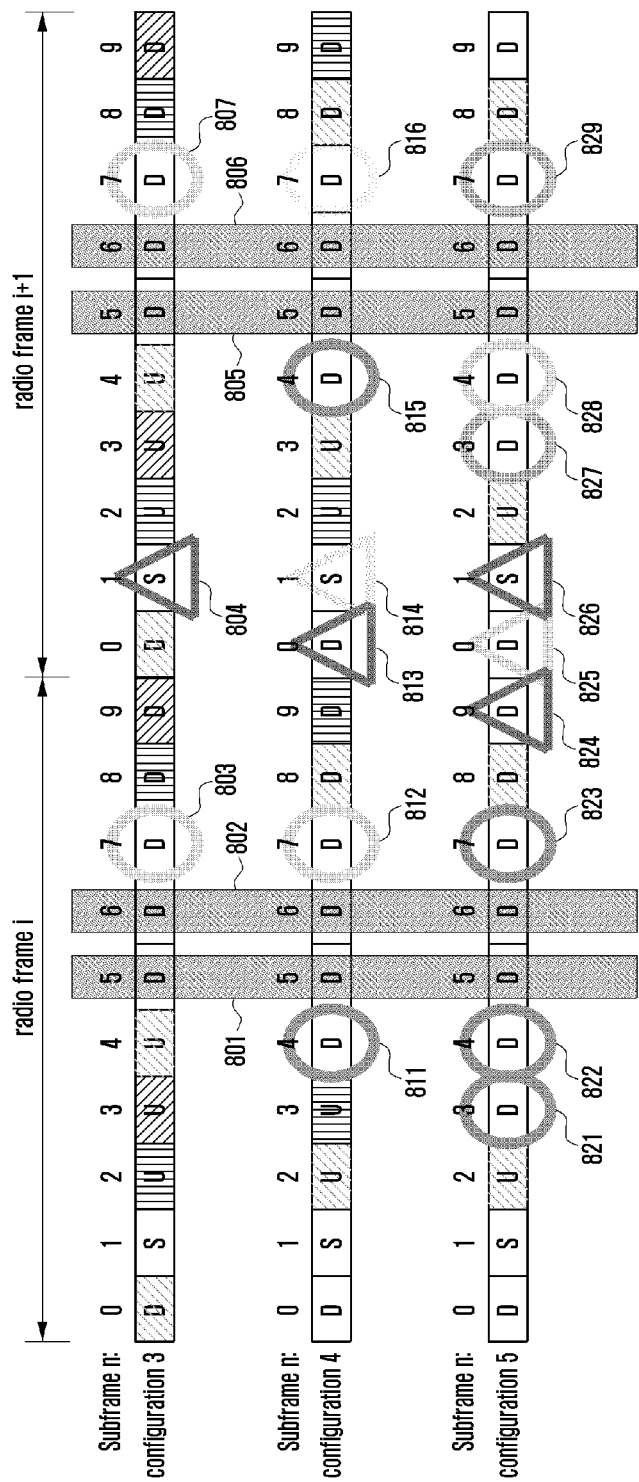
[Fig. 8]

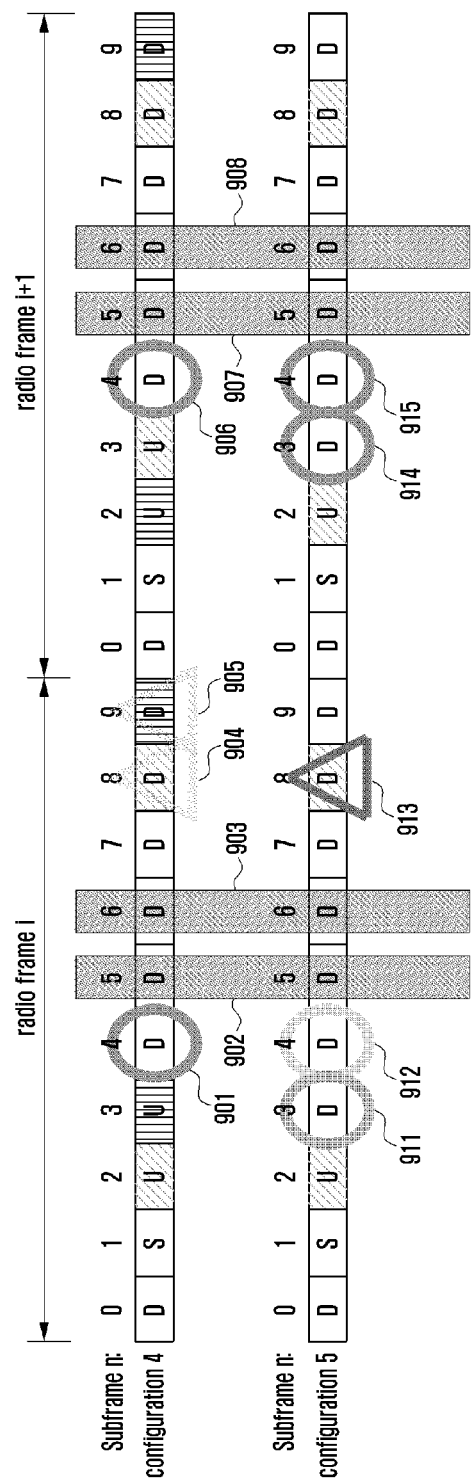
[Fig. 9]

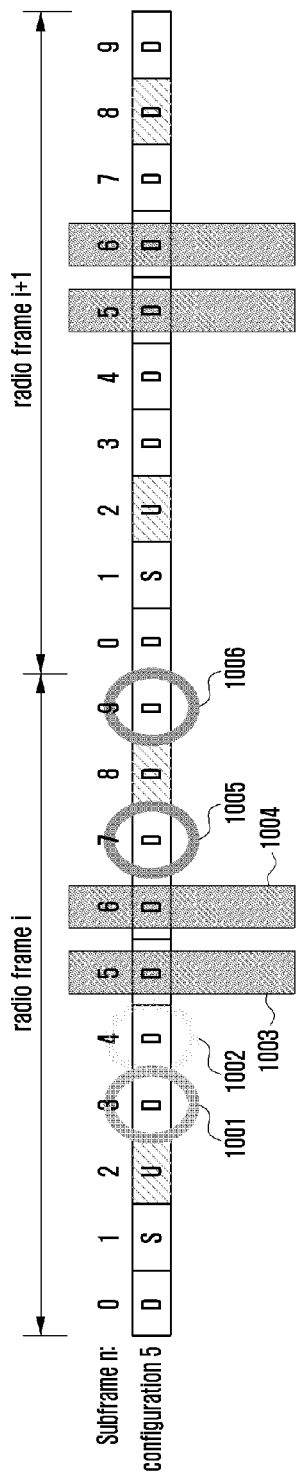
[Fig. 10]

[Fig. 11]
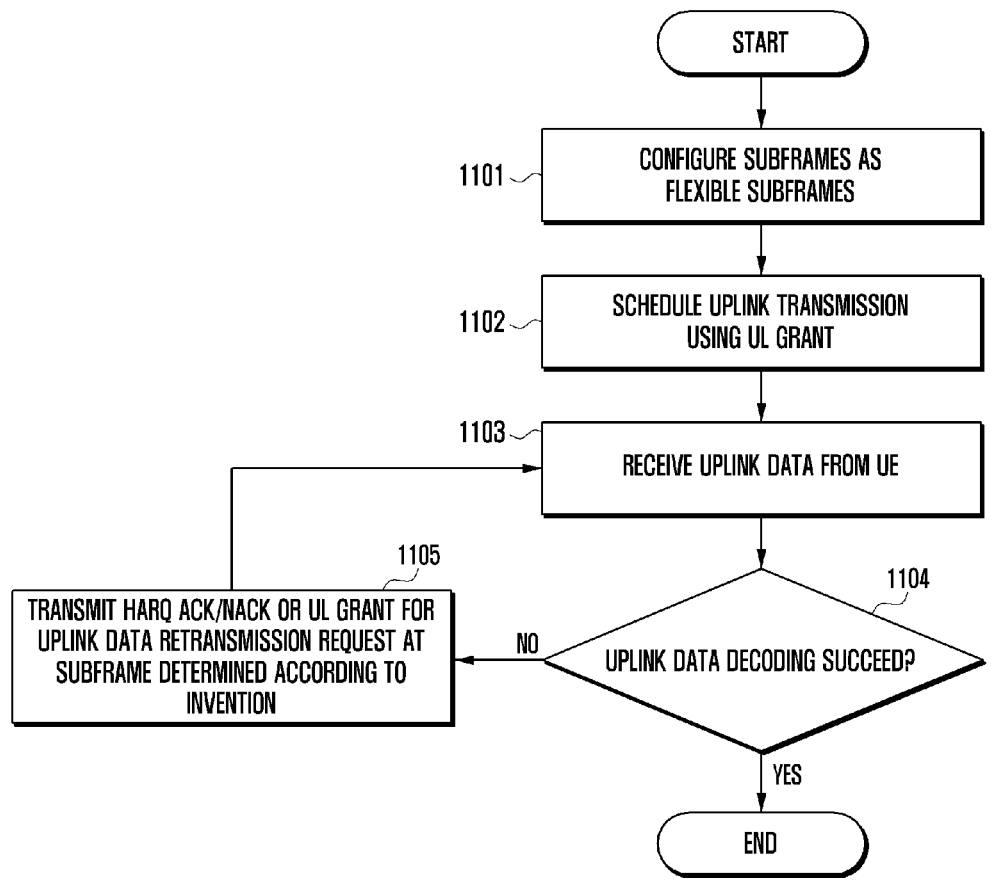

[Fig. 12]
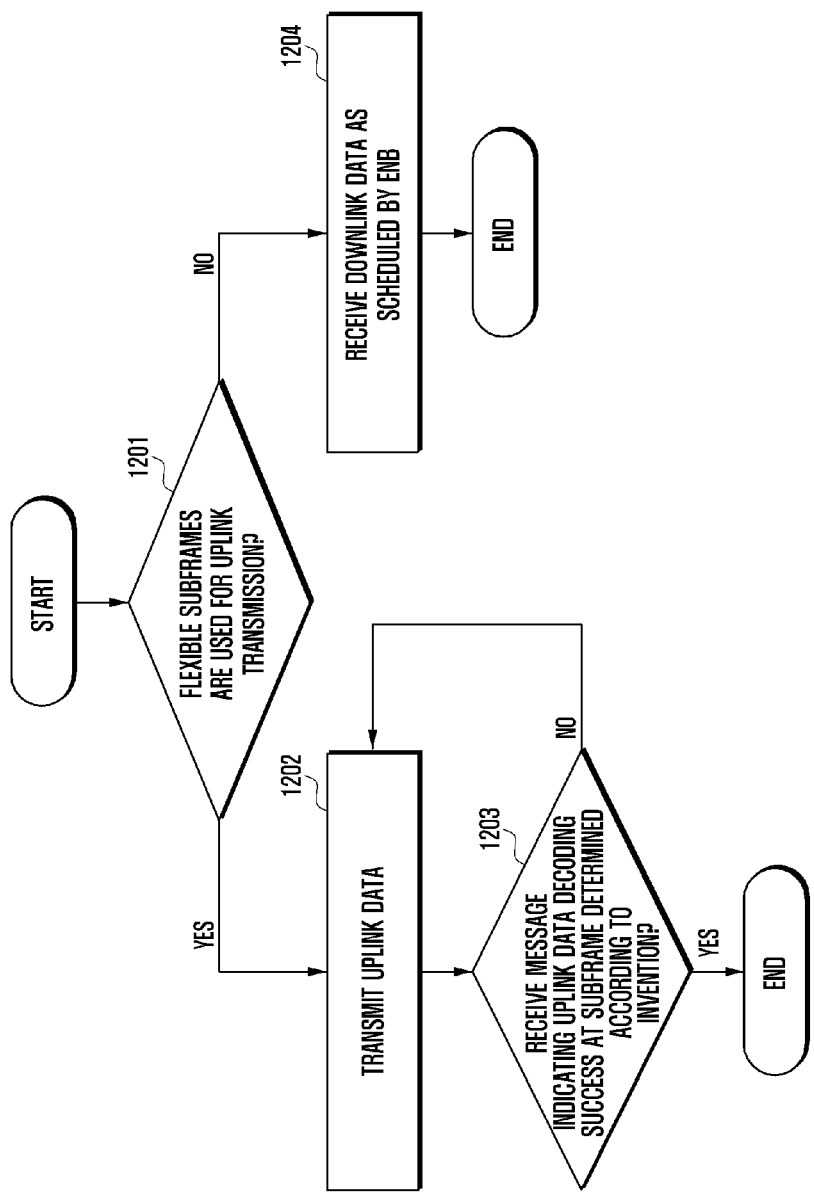

[Fig. 13]
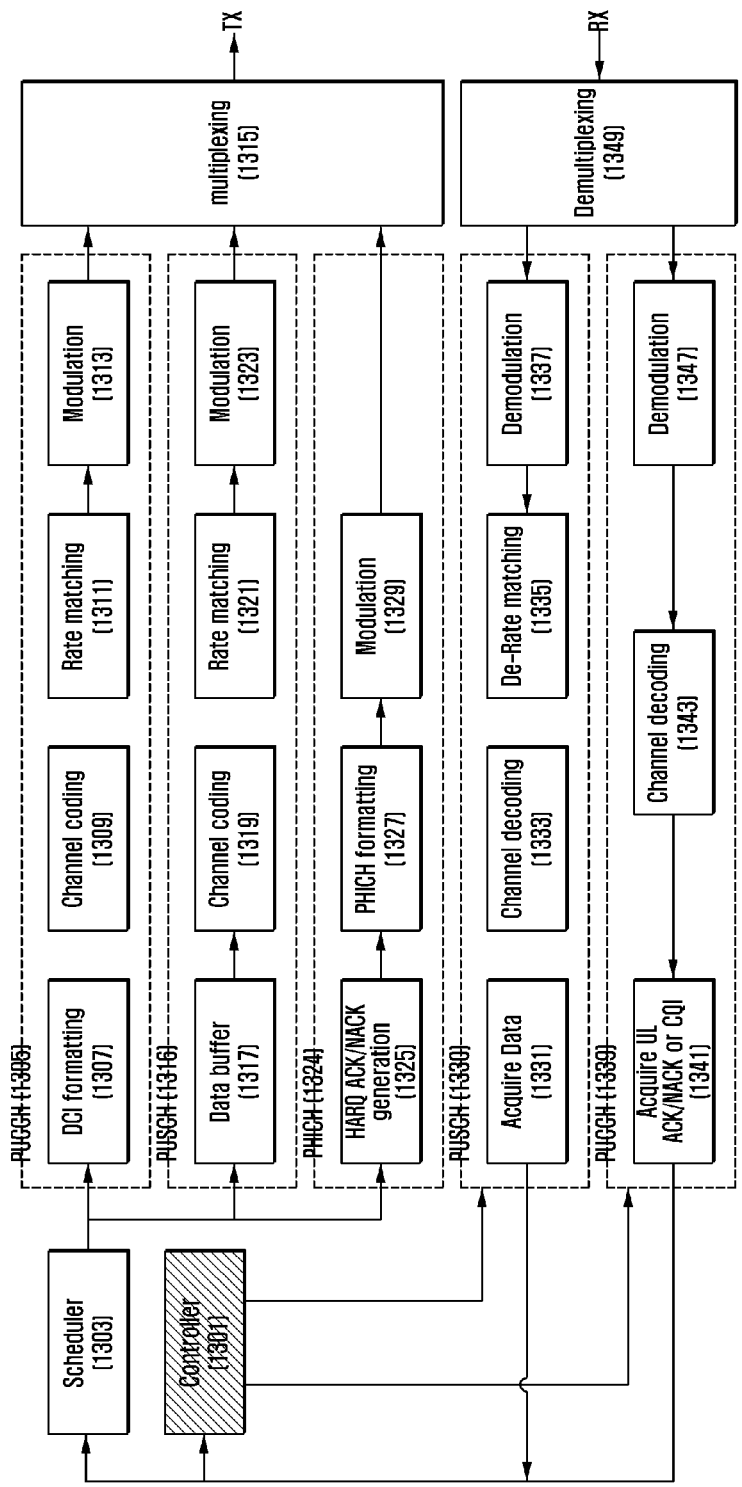

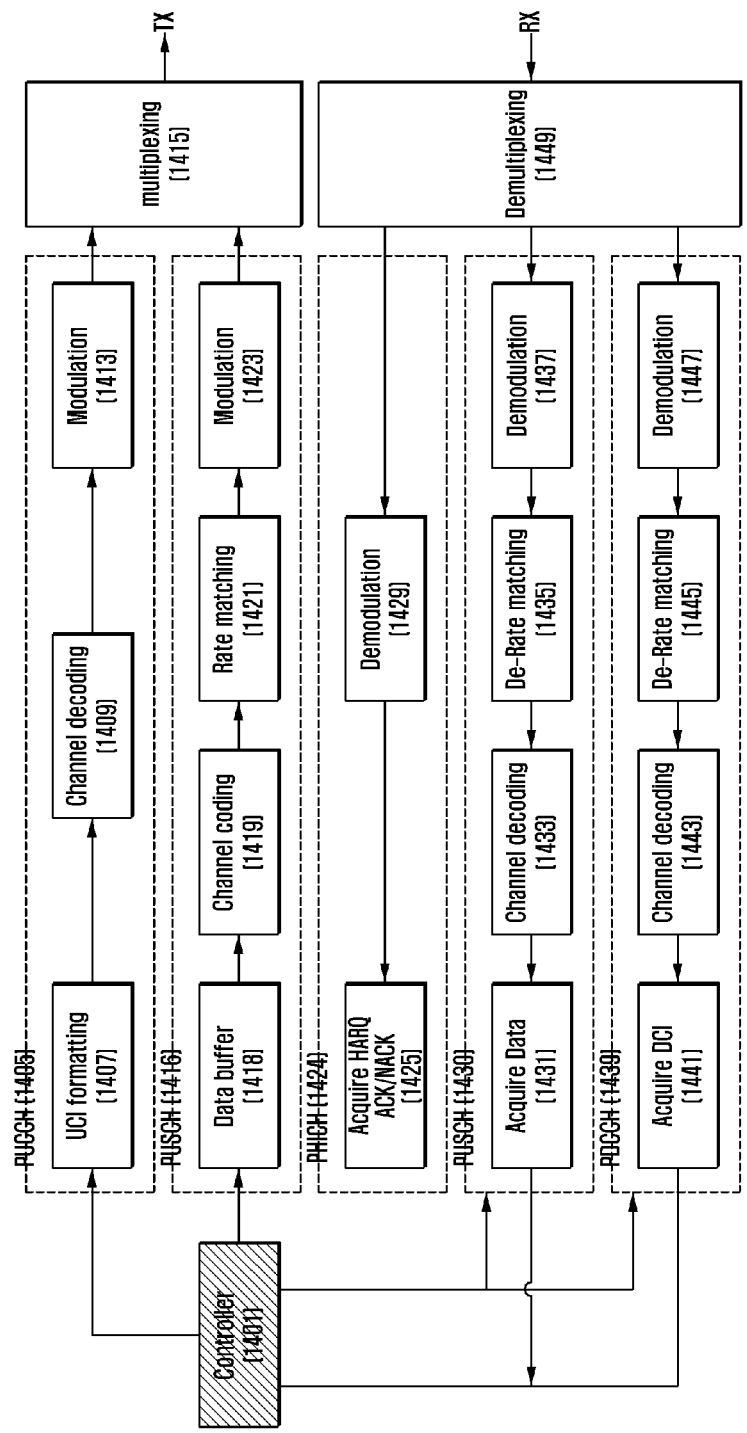
[Fig. 14]

MOBILE COMMUNICATION SYSTEM AND DATA TRANSMISSION METHOD THEREOF

TECHNICAL FIELD

The present invention relates to a cellular radio communication system and, in particular, a method and apparatus for transmitting data using flexible subframes in a Time Division Duplex (TDD) system.

BACKGROUND ART

There are many researches being conducted recently on the Orthogonal Frequency Division Multiple Access (OFDMA) and Single Carrier-Frequency Division multiple Access (SC-FDMA) in the cellular communication field. Such a multiple access technology is used to allocate and manage the time-frequency resources for data and/or control information transmission to and from multiple users without overlapping from each other, i.e. orthogonally. This makes possible to discriminate among per-user data and control informations.

One of the significant features of the cellular communication system is to support scalable bandwidth for providing high speed wireless data service. For example, the Long Term Evolution (LTE) system is capable of supporting various bandwidths, e.g. 20/15/5/3/1.4 Mhz. The mobile carriers can provide their services with one of the available bandwidths. A User Equipment (UE) can operate with various capabilities of minimum 1.4 MHz bandwidth up to 20 MHz bandwidth. Meanwhile, the LTE-Advanced (hereinafter, called LTE-A) system can support high data rate transmission over a wide bandwidth up to 100 MHz for a single UE with carrier aggregation (CA) technique.

In order to support the high data rate transmission, the LTE-A system requires the bandwidth wider than that of the LTE system while preserving backward compatibility to the legacy systems for supporting the LTE UEs. For the backward compatibility, the system bandwidth of the LTE-A system is divided into a plurality of subbands or component carriers (CC) that can be used for transmission/reception of LTE UEs and aggregated for the high data rate transmission of the LTE-A system with the transmission/reception process of the legacy LTE system per component carrier.

Each component carrier or cell can be categorized into one of primary cell and secondary cell according to its usage or significance. From the view point of the UE, only one primary cell exists with other secondary cells. In the current LTE-A system, the uplink control channel can be transmitted in the primary cell while uplink data channel can be transmitted in both the primary and secondary cells.

The scheduling information for the data transmitted on the component carriers is transmitted to the UE in Downlink Control Information (DCI). The DCI is generated in different DCI format according to whether scheduling information is of uplink or downlink, whether the DCI is compact DCI, whether spatial multiplexing with multiple antennas is applied, and whether the DCI is the power control DCI. For example, the DCI format 1 for the control information about downlink data to which Multiple Input Multiple Output (MIMO) is not applied is composed of the following control informations.

Resource allocation type 0/1 flag: It notifies the UE of whether the resource allocation type is type 0 or type 1. Here, type 0 indicates resource allocation in unit of resource block group (RBG) in bitmap method. In LTE and LTE-A systems, the basic scheduling unit is resource block (RB) representing time and frequency resource, and RBG is composed of a plurality of RBs and basic scheduling unit of in type 0. Type 1 indicates allocation of specific RB in RBG.

Resource block assignment: It notifies the UE of RB allocated for data transmission. At this time, the resource expressed according to the system bandwidth and resource allocation scheme is determined.

Modulation and coding scheme: It notifies the UE of modulation scheme and coding rate applied for data transmission.

HARQ process number: it notifies the UE of HARQ process number.

New data indicator: It notifies the UE of whether the transmission is HARQ initial transmission or retransmission.

Redundancy version: It notifies the UE of redundancy version of HARQ.

TPC command for PUCCH: It notifies the UE of power control command for Physical Uplink Control Channel (PUCCH) as uplink control channel.

In TDD communication system, the downlink and uplink share the same frequency and discriminated from each other in time domain. In LTE TDD mode, the downlink and uplink signals are discriminated from each other per subframe. According to the traffic loads in uplink and downlink, the uplink/downlink subframes are assigned symmetrically or asymmetrically in time domain. This means that one of the downlink and uplink can be assigned more subframes than the other. In LTE, a subframe has the length of 1 ms, and 10 subframes form a radio frame.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 1 shows the TDD UL-DL configurations defined in LTE standard. In table 1, 'D' denotes the subframe configured for downlink transmission, and 'U' denotes the subframe configured for uplink transmission. 'S' denotes the Special subframe composed of Downlink Pilot Time Slot (DwPTS), Guard Period (GP), and Uplink Pilot Time Slot (UpPTS). The DwPTS can be used for transmitting control information in downlink like a normal subframe and even downlink data if it is elongated long enough according to the configuration of the special subframe.

The GP is a period for switching from downlink to uplink and its length is determined according to the network configuration. The UpPTS is used for transmitting UE's Sounding Reference Signal (SRS) for uplink channel state estimation or Random Access Channel for UE's random access.

In an exemplary case of TDD UL-DL configuration #6, subframes #0, #5, and #9 are configured for downlink data and control information transmission, subframes #2, #3, #4, #7, and #8 are configured for uplink data and control information transmission. The special subframes #1 and #6 can be used for control information or data transmission in downlink and SRS or RACH in uplink.

In TDD system, since the downlink or uplink transmission is allowed for specific time duration, it is necessary to define detailed timing relationship between uplink and downlink physical channels correlated such as control channel for data scheduling, data channel to be scheduled, and HARQ ACK/NACK channel corresponding to the data channel.

The uplink/downlink timing relationship between the Physical Shared Channel (PDSCH) as downlink data transmission channel and the Physical Uplink Control Channel as physical channel for transmitting uplink HARQ ACK/NACK corresponding to the PDSCH or Physical Uplink Shared Channel (PUSCH).

If PDSCH is received from the eNB in (n−k)th subframe, the UE sends uplink HARQ ACK/NACK for the PDSCH in nth uplink subframe. Here, k denotes an element of a set K which is defined as illustrated in table 2.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 3 shows the UL-DL configurations of subframes carrying HARQ ACK/NACK rearranged according the definition of table 2 when PDSCH is transmitted downlink subframe (D) or special subframes (S)n.

TABLE 3

| Subframe n UL-DLConfiguration | 0 | 1 | 2 | 3 | 4 | 5 | 6 | 7 | 8 | 9 |
|---|---|---|---|---|---|---|---|---|---|---|
| 0 | D4 | S6 | U | U | U | D4 | S6 | U | U | U |
| 1 | D7 | S6 | U | U | D4 | D7 | S6 | U | U | D4 |
| 2 | D7 | S6 | U | D4 | D8 | D7 | S6 | U | D4 | D8 |
| 3 | D4 | S11 | U | U | U | D7 | D6 | D6 | D5 | D5 |
| 4 | D12 | S11 | U | U | D8 | D7 | D7 | D6 | D5 | D4 |
| 5 | D12 | S11 | U | D9 | D8 | D7 | D6 | D5 | D4 | D13 |
| 6 | D7 | S7 | U | U | U | D7 | S7 | U | U | D5 |

FIG. 1 is a diagram illustrating a principle of transmitting uplink HARQ ACK/NACK in the conventional method. FIG. 1 shows which frame is used for transmitting the uplink HARQ ACK/NACK corresponding to the PDSCH transmitted in downlink or special subframe in TDD UL-DL configuration #6 according to the definition in table 3. A description is made of table 3 with reference to FIG. 1.

For example, the UE transmits HARQ ACK/NACK 103 in the subframe #7 of ith radio frame in response to the PDSCH 101 transmitted by the eNB in the subframe #0 of the ith radio frame. At this time, the DCI including the scheduling information about the PDSCH 101 is transmitted in the PDCCH of the same subframe carrying the PDSCH 101. In another example, the UE transmits the uplink HARQ ACK/NACK 107 corresponding to the PDSCH 105, which is transmitted by the eNB in the subframe #9 of the ith radio subframe, in the subframe #4 of the (i+1)th radio frame. Likewise, the DCI including the scheduling information about PDSCH 105 is transmitted through PDCCH of the same subframe carrying the PDSCH 105.

In the LTE system, an asynchronous HARQ scheme having unfixed data retransmission time point. That is, when HARQ NACK feedback is received from the UE in response to the data of HARQ initial transmission, the eNB determines the HARQ retransmission time point freely according to the scheduling operation. The UE decodes the received data and buffers the erroneous HARQ data to be combined with next HARQ retransmission data. In order to maintain the reception buffer capacity to a certain limit, the maximum number of downlink HARQ processes is defined per TDD UL-DL configuration as shown in table 4. One HARQ process maps to one subframe in time domain.

Table 4

TABLE 4

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Referring to the example of FIG. 1, the UE decodes the PDSCH 101 transmitted by the eNB in the subframe #0 of ith radio frame. If the decoding result is erroneous, the UE transmits an HARQ NACK 103 in the subframe #7 of ith subframe. Upon receipt of the HARQ NACK, the eNB transmits PDSCH 109 including the retransmission data corresponding to PDSCH 101 along with PDCCH. FIG. 1 shows an exemplary case where the maximum number of downlink HARQ processes is set to 6 according to TDD UL-DL configuration #6 of table 4 such that the retransmission data is transmitted in the subframe #1 of (i+1)th radio frame. That is, there are 6 downlink HARQ processes 111, 112, 113, 114, 115, and 116 between the initial transmission PDSCH 101 and retransmission PDSCH 109.

In the LTE system, the synchronous HARQ scheme having fixed data transmission time point is adopted in uplink unlike the downlink HARQ. That is, the uplink/downlink timing relationship among Physical Uplink Shared Channel (PUSCH), PUCCH preceding PUSCH, and Physical Hybrid Indicator Channel (PHICH) carrying downlink HARQ ACK/NACK corresponding to the PUSCH are fixed according to the following rule.

If the PDCCH including uplink scheduling control information or PHICH carrying the downlink HARQ ACK/NACK which is transmitted by the eNB at subframe n is received, the UE transmits uplink data corresponding to the control information received at (n+k)th subframe on PUSCH. Here, k determined by referencing table 5.

TABLE 5

| TDD UL/ DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | 6 | | | 4 | | 6 | | | 4 |
| 2 | | | | 4 | | | | | 4 | |
| 3 | | 4 | | | | | | | 4 | 4 |
| 4 | | | | | | | | | 4 | 4 |
| 5 | | | | | | | | | 4 | |
| 6 | | 7 | 7 | | | | 7 | 7 | | 5 |

The UE receives PHICH carrying downlink HARQ ACK/NACK from the eNB at the ith subframe. At this time, the PHICH corresponds to the PUSCH transmitted by the UE at (i−k)th subframe. Here, k is determined by referencing table 6.

TABLE 6

| TDD UL/ DL Configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | | 4 | | | 6 | | 4 | | 6 |
| 2 | | | | 6 | | | | | 6 | |
| 3 | | 6 | | | | | | | 6 | 6 |
| 4 | | | | | | | | | 6 | 6 |
| 5 | | | | | | | | | 6 | |
| 6 | | 6 | 4 | | | | 7 | 4 | | 6 |

FIG. 2 is a diagram illustrating a principle of transmitting uplink PUSCH in the conventional method. FIG. 2 shows which subframe is used for transmitting the PUSCH corresponding to the PDCCH or PHICH transmitted in downlink or special subframe in TDD UL-DL configuration #1 according to the definition in tables 5 and 6.

For example, the eNB transmits PDCCH or PHICH 201 at subframe #1 of ith radio frame. In reply, The UE transmits PUSCH 203 corresponding to the PDCCH or PHICH 201 at the subframe #7 of the ith radio frame. The eNB transmits the PHICH 205 corresponding to the PUSCH at the subframe #1 of the (i+1)th radio frame.

In another exemplary case, the eNB transmits the PDCCH or PHICH 207 to the UE at the subframe #6 of the ith radio frame. The UE transmits the PUSCH 209 corresponding to the PDCCH or PHICH 207 at the subframe #2 of (i+1)th radio frame. The eNB transmits the PHICH 211 corresponding to the PUSCH 209 to the UE at the subframe #6 of the (i+1)th radio frame.

In the LTE TDD system, the downlink transmission of PDCCH or PHICH corresponding to PUSCH may be limited to specific downlink subframes. Accordingly, it is possible to secure the least transmission/reception processing time of the eNB and UE. For example, in case of the TDD UL-DL configuration #1 of FIG. 2, the PDCCH for scheduling PUSCH or PHICH corresponding to the PUSCH is not transmitted at the subframes #0 and #5.

DISCLOSURE OF INVENTION

Technical Problem

Typically, once the TDD UL-DL configuration is selected in the TDD system, the numbers of uplink and downlink subframes are determined fixedly. Accordingly, when the downlink data amount becomes greater than the uplink data amount at certain timing, the eNB cannot handle this situation dynamically.

Solution to Problem

In accordance with an aspect of the present invention, a data transmission method of a base station includes configuring subframes irrelevant to Hybrid Automatic Repeat reQuest (HARQ) process as flexible subframes; scheduling uplink transmission at the flexible subframes with uplink grant; receiving uplink data transmitted by a terminal at the flexible subframes as scheduled; and transmitting, when decoding the uplink data fails, HARQ acknowledgement/negative acknowledgement (ACK/NACK) or uplink grant to request retransmission of the uplink data.

In accordance with another aspect of the present invention, a data transmission method of a terminal includes determining whether an uplink grant is received at a downlink subframe corresponding to a flexible subframe configured for uplink transmission; transmitting, when the uplink grant is received, uplink data at the flexible subframe; and retransmitting, when a message indicating successful decoding of the uplink data is not received, the uplink data.

In accordance with another aspect of the present invention, a base station includes a controller which configures subframes irrelevant to Hybrid Automatic Repeat reQuest (HARQ) as flexible subframes and schedules uplink data at the flexible subframes using an uplink grant; a receiver which receives the uplink data transmitted from a terminal at the flexible subframes as scheduled; and a transmitter which transmits, when decoding the uplink data fails, HARQ ACK/NACK or the uplink grant for uplink data retransmission request under the control of the controller.

In accordance with still another aspect of the present invention, a terminal includes a receiver which receives an uplink grant at a downlink subframe corresponding to a flexible subframe used for uplink transmission; a transmitter which transmits, when the uplink grant is received, uplink data at the flexible subframe; and a controller which controls, when a message indicating successful decoding of the uplink data is not received, the transmitter to retransmit the uplink data.

Advantageous Effects of Invention

Although the embodiments of the present invention are directed to the TDD system, it will be understood by those skilled in the art that the present invention can be applied even to other communication systems having the similar technical background and channel format, with a slight modification, without departing from the spirit and scope of the present invention.

BRIEF DESCRIPTION OF DRAWINGS

FIG. 3 is a diagram illustrating exemplary TDD UL-DL configurations in association with uplink HARQ process according to an embodiment of the present invention;

FIG. 4 is a diagram illustrating TDD UL-DL configurations for use of the flexible subframes in uplink transmission and HARQ ACK/NACK corresponding to the uplink transmission according to the first embodiment of the present invention;

FIG. 5 is a diagram illustrating TDD UL-DL configurations for use of the flexible subframes in uplink transmission and HARQ ACK/NACK corresponding to the uplink transmission according to the second embodiment of the present invention;

FIG. 6 is a diagram illustrating TDD UL-DL configuration for use of the flexible subframes in uplink transmission and HARQ ACK/NACK corresponding to the uplink transmission according to the third embodiment of the present invention;

FIG. 7 is a diagram illustrating TDD UL-DL configurations for use of the flexible subframes in uplink transmission and HARQ ACK/NACK corresponding to the uplink transmission according to the fourth embodiment of the present invention;

FIG. 8 is a diagram illustrating TDD UL-DL configurations for use of the flexible subframes in uplink transmission and HARQ ACK/NACK corresponding to the uplink transmission according to the fifth embodiment of the present invention;

FIG. 9 is a diagram illustrating TDD UL-DL configurations for use of the flexible subframe in uplink transmission and HARQ ACK/NACK corresponding to the uplink transmission according to the sixth embodiment of the present invention;

FIG. 10 is a diagram illustrating a TDD UL-DL configuration for use of the flexible subframes in uplink transmission and HARQ ACK/NACK corresponding to the uplink transmission according to the seventh embodiment of the present invention;

FIG. 11 is a flowchart illustrating the eNB procedure of the method according to an embodiment of the present invention;

FIG. 12 is a flowchart illustrating the UE procedure of the method according to an embodiment of the present invention;

FIG. 13 is a block diagram illustrating a configuration of the eNB according to an embodiment of the present invention; and FIG. 14 is a block diagram illustrating a configuration of the UE according to an embodiment of the present invention.

MODE FOR THE INVENTION

Figure 1:
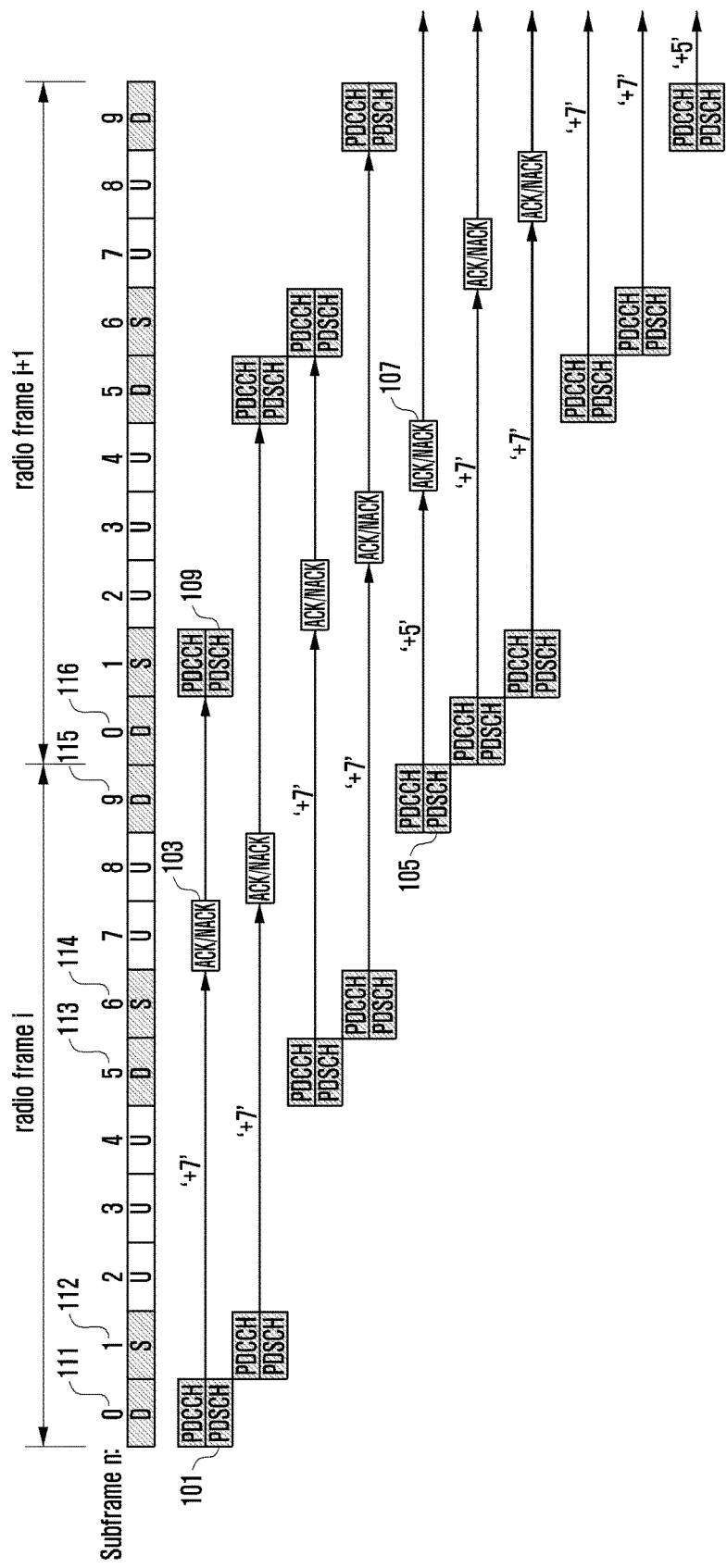
FIG. 1 is a diagram illustrating a principle of transmitting uplink HARQ ACK/NACK in the conventional method.
Figure 2:
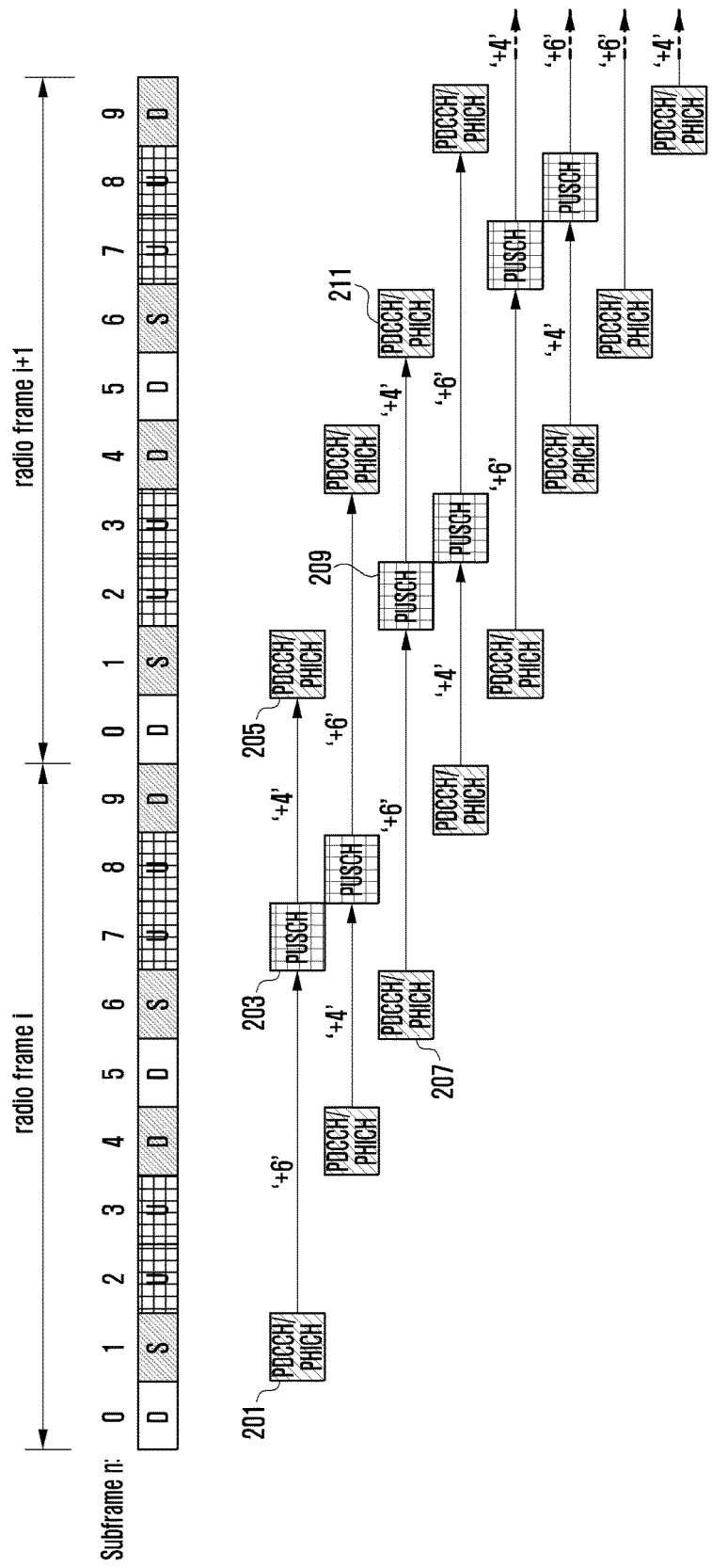
FIG. 2 is a diagram illustrating a principle of transmitting uplink PUSCH in the conventional method.

Exemplary embodiments of the present invention are described with reference to the accompanying drawings in detail. Detailed description of well-known functions and structures incorporated herein may be omitted to avoid obscuring the subject matter of the present invention. Also, the terms used in the following description are defined taking into consideration the functions provided in the present invention. The definitions of these terms should be determined based on the whole content of this specification, because they may be changed in accordance with the option of a user or operator or a usual practice.

A description is made of the method for utilizing the downlink subframe configured as a flexible subframe for uplink transmission without influencing the uplink HARQ process associated to the downlink subframe configured as the flexible subframe. Also, a description is made of the method for transmitting, at the eNB, a UL grant for uplink transmission or an HARQ ACK/NACK feedback when the flexible subframe is used for uplink transmission.

FIG. 3 is a diagram illustrating exemplary TDD UL-DL configurations in association with uplink HARQ process according to an embodiment of the present invention.

FIG. 3 shows the TDD UL-DL configurations 1 to 5 with uplink HARQ process operation.

Referring to FIG. 3, the subframes filled with the same pattern consists of an uplink HARQ process in each of the configurations denoted by reference numbers 301 to 305. In the TDD UL-DL configuration 1 301, the eNB transmits a UL grant at the special subframe #1 of the ith radio frame and the UE transmits PUSCH at the subframe #7 of the ith radio frame. Also, the eNB transmits UL grant for retransmission of the PUSCH or PHICH at the special subframe #1 of the (i+1)th radio frame, and the UE retransmits PUSCH at the uplink subframe #7 of the (i+1)th radio frame.

In the TDD UL-DL configuration 2 303, the eNB transmits a UL grant at the subframe #8 of the ith radio frame, and the UE transmits PUSCH at the subframe #2 of the (i+1)th radio frame. Also, the eNB transmits a UL grant for retransmission of the PUSCH or PHICH at the subframe #8 of the (i+1)th special subframe, and the UE retransmits the PUSCH at the subframe #2 of the (i+2)th radio frame. In FIG. 3, the blank downlink and special subframes are the subframes irrelevant to the HARQ process for uplink transmission. For convenience purpose, the subframe irrelevant to any HARQ process is referred to as an irrelevant subframe in the present invention.

In the present invention, the irrelevant subframes are configured as flexible subframes for use in UL transmission and UL grant for the UL transmission or HARQ ACK/NACK feedback. The flexible subframe utilization method is proposed as follows.

The first approach is to configure the irrelevant subframes as flexible subframes for use in uplink transmission. The first approach is applied to all embodiments of the present invention.

The second approach is to transmit the UL grant for uplink transmission or HARQ ACK/NACK in the irrelevant subframes when the flexible subframes are used for uplink transmission. The method for transmitting UL grant or HARQ ACK/NACK in irrelevant subframes configured as flexible subframes is applied to the embodiments of FIGS. 4, 6, 7, and 10. The method for transmitting UL grant or HARQ ACK/NACK in the irrelevant subframes which are not configured as flexible subframes is applied to the embodiments 5 and 8.

The third approach is to transmit the UL grant for uplink transmission or HARQ ACK/NACK in normal downlink subframes when the flexible subframes are used for uplink transmission. This method is applied to the embodiment of FIG. 9.

Descriptions are made of the methods for utilizing flexible subframes according to the embodiments of the present invention.

FIG. 4 is a diagram illustrating TDD UL-DL configurations for use of the flexible subframes in uplink transmission and HARQ ACK/NACK corresponding to the uplink transmission according to the first embodiment of the present invention. Here, the description is directed to the non-Backward Compatible Carrier (non-BCC) where none of Release (Rel.) 8, 9, and 10 legacy UEs exists.

The legacy terminal operating in TDD mode may receive the synchronization signal at the 5th and 6th subframe of every radio frame. In case that all of the legacy and non-legacy UEs receive the synchronization signal transmitted by the eNB on the BCC, it is not necessary for the eNB to transmit the synchronization signal at the 5th and 6th subframes on the non-BCC. Accordingly, it is possible to configure the 5th and 6th subframes on the non-BCC as flexible subframes for use in uplink transmission.

In the TDD UL-DL configurations #3, #4, and #5, the irrelevant subframes are configured as flexible subframes.

The subframes available for uplink transmission and the subframes for UL grant or HARQ ACK/NACK related to the uplink transmission are configured to match each other as shown in FIG. 4. In more detail, subframes 401 and 404, subframes 402 and 405, subframes 403 and 306, subframes 411 and 415, subframes 412 and 416, subframes 413 and 417, subframes 414 and 418, subframes 421 and 326, subframe 422 and 427, subframes 423 and 428, subframes 424 and 429, and subframes 425 and 430 are mapped to each other respectively to be configured as flexible subframes.

1) In TDD UL-DL configuration #3, it is assumed that the downlink subframe #5 401 of the ith radio frame and the downlink subframe #5 404 of the (i+1)th radio frame are configured as flexible subframes of which the flexible subframe 401 is used for uplink transmission. In this case, the UL grant or the HARQ ACK/NACK in response to the uplink transmission at the flexible subframe 401 is transmitted at the flexible subframe #5 404 of (i+1)th radio frame.

2) In TDD UL-DL configuration #3, it is assumed that the downlink subframe #5 401 of (i+2)th radio frame (since the subframes of (i+2)th radio frame are not shown in the drawing, the description is made with reference to the downlink subframe #5 of ith radio frame) and the downlink subframes #5 of (i+1)th radio frame as flexible subframes of which the flexible subframe 404 is used for uplink transmission. In this case, the UL grant or HARQ ACK/NACK as the reply to the uplink transmission at the flexible subframe 404 is transmitted at the flexible subframe #5 of the (i+2)th radio frame.

3) In TDD UL-DL configuration #3, it is assumed that the downlink subframe #5 401 and downlink subframe #6 405 of the ith radio frame and the downlink subframe #5 404 and downlink subframe #6 405 of the (i+1)th radio frame are configured as flexible subframes of which the flexible subframes 401 and 402 are used for uplink transmission. In this case, the UL grant or HARQ ACK/NACK as the reply to the uplink transmission at the flexible subframes 401 and 402 are is transmitted at the flexible subframes 404 and 405 of the (i+1)th radio frame.

4) In TDD UL-DL configuration #3, it is assumed that the downlink subframes #5 401, #6 402, and #7 403 of the ith radio frame and the downlink subframes #5 404, #6 405, and #7 406 of the (i+1)th radio frame are configured as flexible subframes of which the flexible subframes 401, 402, and 403 are used for uplink transmission. In this case, the UL grant or HARQ ACK/NACK as the reply to the uplink transmission at the flexible subframes 401, 403, and 405 is transmitted at the flexible subframes 404, 405, and 406 of the (i+1)th radio frame.

5) In TDD UL-DL configuration #3, it is assumed that the downlink subframes #5 401 and #6 403 of the ith radio frame, the downlink subframes #5 404, #6 405, and #7 406 of the (i+1)th radio frame, and the downlink subframe #6 402 of the (i+2)th radio frame (since the subframes of (i+2)th radio frame are not shown in the drawing, the description is made with reference to the downlink subframe #5 of ith radio frame) are configured as flexible subframes of which flexible subframes 401, 403, and 405 are used for uplink transmission. In this case, the UL grant or HARQ ACK/NACK as the reply to the uplink transmission at the flexible subframes 401, 403, and 405 is transmitted at the flexible subframe 405 of the (i+1)th radio frame and the flexible subframe 402 of the (i+2)th radio frame.

Since the DL-UL switching occurs between the subframes #6 and #7 of the ith radio frame, the UE needs time for switching from reception mode to transmission mode. In order to accomplish this, K OFDM symbols at the beginning of the subframe #7 are used for the switching. The OFDM symbols following them are used for uplink transmission. Here, K may be information through higher layer signaling or predetermined depending on the distance between the UE and the eNB.

The method for configuring flexible subframes in the TDD UL-DL configuration #3 and transmitting UL grant or HARQ ACK/NACK using the flexible subframe has been described hereinabove. This method can be applied to the TDD UL-DL configuration #4 and TDD UL-DL configuration #5 in similar manner. In the TDD UL-DL configuration #4 and TDD UL-DL configuration #5, however, one more subframe may be configured in the ith and (i+1)th radio frame as compared to the TDD UL-DL configuration #3.

FIG. 5 is a diagram illustrating TDD UL-DL configurations for use of the flexible subframes in uplink transmission and HARQ ACK/NACK corresponding to the uplink transmission according to the second embodiment of the present invention. Here, a description is directed to the non-Backward Compatible Carrier (non-BCC) where none of Release (Rel.) 8, 9, and 10 legacy UEs exists.

The legacy UE operating in TDD mode may receive the synchronization signal at the 5th and 6th subframes of every radio frame. In case that all of the legacy and non-legacy UEs receive the synchronization signal transmitted by the eNB on the BCC, it is not necessary for the eNB to transmit the synchronization signal at the 5th and 6th subframes on the non-BCC. Accordingly, it is possible to configure the 5th and 6th subframes on the non-BCC as flexible subframes for use in uplink transmission.

In the TDD UL-DL configurations #3, #4, and #5, the irrelevant subframes are configured as flexible subframes. In FIG. 5, the subframes available for use in uplink transmission are marked with circles while the subframes available for used in UL grant or HARQ ACK/NACK transmission as the reply to the uplink transmission are marked with triangles. It may possible to predetermine the subframe for transmitting UL grant or HARQ ACK/NACK, among the subframes marked with triangle, as the reply to the uplink transmission made at a specific subframe among the subframes marked with circle. Examples are as follows.

1) In the TDD UL-DL configuration #3, it is assumed that the downlink subframe #5 of the ith radio frame and the downlink subframe #5 of the (i+1)th radio frame are configured as flexible subframes of which the flexible subframe 501 is used for uplink transmission. In this case, the UL grant or HARQ ACK/NACK as the reply to the uplink transmission at the flexible subframe 501 is transmitted at the special subframe #1 504 of the (i+1)th radio frame. If retransmission is required, the flexible subframe #5 505 of the (i+1)th radio frame is used for uplink retransmission.

2). In the TDD UL-DL configuration #3, it is assumed that the downlink subframes #5 501, #6 502, and #7 503 of the ith radio frame and the downlink subframes #5 505, #6 506, and #7 507 of the (i+1)th radio frame are configured as flexible subframes of which the flexible subframes 501 and 507 are used for uplink transmission. In this case, the UL grant or HARQ ACK/NACK as the reply to the uplink transmission at the flexible subframes 501 and 507 are transmitted at the special subframe #1 504 of the (i+1)th radio frame. If retransmission is required, the flexible subframes #5 505 and #7 507 of the (i+1)th radio frame are used for uplink retransmission. In this case, since the DL-UL switching occurs between the subframes #6 502 and #7 503 of the ith radio frame, it is necessary for the UE to secure the time for switching from the reception mode to the transmission. In order to accomplish this, K OFDM symbols at the beginning of the subframe #7 are used for switching time, the rest OFDM symbols are used for uplink transmission. Here, K may be information through higher layer signaling or predetermined depending on the distance between the UE and the eNB.

3) In the TDD UL-DL configuration #4, it is assumed that the downlink subframes #4 511, #5 512, #6 513, and #7 514 of the ith radio frame and downlink subframes #4 517, #5 518, #6 519, and #7 520 of the (i+1)th radio frame are configured as flexible subframes of which flexible subframes 511, 512, 513, and 514 are used for uplink transmission. In this case, the UL grant or HARQ ACK/NACK in replay to the uplink transmission at the flexible subframes 511 and 512 are predetermined to be transmitted at the downlink subframe #0 515 of the (i+1)th radio frame. Also, the UL grant or HARQ ACK/NACK as the reply to the uplink transmission at the flexible subframes 513 and 514 are predetermined to be transmitted at the special subframe #1 516 of the (i+1)th radio frame. If retransmission is required, the flexible subframes #4 517, #5 518, #6 519, and #7 520 of the (i+1)th radio frame are used for uplink transmission.

4) In the TDD UL-DL configuration #5, it is assumed that the downlink subframes #3 521, #4 522, #5 523, #6 524, and #7 525 of the ith radio frame and the downlink subframes #3 529, #4 530, #5 531, #6 532, and #7 533 are configured as flexible subframes of which flexible subframes 521, 522, 523, 524, and 525 are used for uplink transmission. In this case, the UL grant or HARQ ACK/NACK as the reply to the uplink transmission at the flexible subframe 521 and 522 may predetermined to be transmitted at the subframe #9 526 of the ith radio frame. Also, the UL grant or HARQ ACK/NACK as the reply to the uplink transmission at the flexible subframe 523 and 524 may be predetermined to be transmitted at the downlink subframe #0 527 of the (i+1)th radio frame. The UL grant or HARQ ACK/NACK as the reply to the uplink transmission at the flexible subframe 525 may be predetermined to be transmitted at the special subframe #1 of the (i+1)th radio frame. If retransmission is required, the flexible subframes #3 529, #4 530, #5 531, #6 532, and #7 533 of the (i+1)th radio frame are used for uplink retransmission.

FIG. 6 is a diagram illustrating TDD UL-DL configuration for use of the flexible subframes in uplink transmission and HARQ ACK/NACK corresponding to the uplink transmission according to the third embodiment of the present invention. The description is directed to the non-Backward Compatible Carrier (non-BCC) where none of Release (Rel.) 8, 9, and 10 legacy UEs exists.

The legacy UE operating in TDD mode receives the synchronization signal at the 5th and 6th subframes of every radio frame. In case that all of the legacy and non-legacy UEs receive the synchronization signal transmitted by the eNB on the BCC, it is not necessary for the eNB to transmits the synchronization at the 5th and 6th subframes on the non-BCC. Accordingly, it is possible to configure the 5th 6th subframes on the non-BCC as flexible subframes for uplink transmission.

In the TDD UL-DL configuration #5, the irrelevant subframes are configured as flexible subframes. In FIG. 6, the subframes available for use in uplink transmission and the subframes available for transmitting UL grant or HARQ ACK/NACK as the reply to uplink transmission are mapped to each other and marked with circles. In more detail, the subframes 601 and 605, the subframes 602 and 606, the subframes 603 and 607, and the subframes 604 and 608 are mapped to each other and configured as flexible subframes. Examples are as follows.

1) In the TDD UL-DL configuration #5, it is assumed that the downlink subframes #3 601, #4 602, #5 603, and #6 604 of the ith radio frame are configured as flexible subframes of which flexible subframes 601, 602, 603, and 604 are used for uplink transmission. In this case, the UL grant or HARQ ACK/NACK in replay to the uplink transmission at the flexible subframes 601, 602, 603, and 604 are transmitted at the subframes #7 605 and #9 606 of the ith radio frame and the downlink subframes #0 607 and #1 608 of the (i+1)th radio frame. If retransmission is required, the subframe of the (i+1)th radio frame which is located at the same position as the initial transmission is used for the uplink retransmission.

FIG. 7 is a diagram illustrating TDD UL-DL configurations for use of the flexible subframes in uplink transmission and HARQ ACK/NACK corresponding to the uplink transmission according to the fourth embodiment of the present invention. The description is directed to the Backward Compatible Carrier (BCC) where the Release (Rel.) 8, 9, and 10 legacy UEs coexists.

The legacy UE operating in TDD mode receives a synchronization signal at the 5th and 6th subframes. Accordingly, the eNB transmits the synchronization signal at the 5th and 6th subframes on the BCC on which legacy UEs operate. In this case, the 5th and 6th subframes on the BCC cannot be configured as flexible subframes so as not to be used for uplink transmission. Since the irrelevant subframes has no resource defined for HARQ ACK/NACK, there is a need of a method for transmitting HARQ ACK/NACK without influence to the data reception of the Rel. 8, 9, and 10 legacy UEs.

The DCI format 3/3A and newly introduced PHICH-RNTI (Radio Network Temporary Identifier) can be used for transmitting HARQ ACK/NACK of a UE group. Accordingly, in the TDD UL-DL configuration #5 of FIG. 6, the irrelevant subframes, with the exception of the subframes #5 701 and 704 and subframes #6 702 and 705, can be configured as flexible subframes. In FIG. 7, the flexible subframes available for uplink transmission and the subframes available for transmitting UL grant or HARQ ACK/NACK in replay to uplink transmission are marked with circles. Examples are as follows.

1) In the TDD UL-DL configuration #3, it is assumed that the downlink subframe #7 of the ith radio frame and the downlink subframe #7 706 of the (i+1)th radio frame are configured as flexible subframes of which the flexible subframe 703 is used for uplink transmission. In this case, the UL grant or HARQ ACK/NACK in replay to the uplink transmission at the flexible subframe 703 is transmitted at the flexible subframe #7 706 of the (i+1)th radio frame.

2) In the TDD UL-DL configuration #3, it is assumed that the downlink subframe #7 of the (i+2)th radio frame (since the subframes of (i+2)th radio frame are not shown in the drawing, the description is made with reference to the downlink subframe #7 of ith radio frame instead) and the downlink subframe #7 of the (i+1)th radio frame are configured as flexible subframes of which the flexible subframe 706 is used for uplink transmission. In this case, the UL grant or HARQ ACK/NACK as the reply to the uplink transmission at the flexible subframe 706 is transmitted at the flexible subframe #7 703 of the (i+2)th radio frame.

3) In the TDD UL-DL configuration #4, it is assumed that the downlink subframes #4 711 and #7 712 of the ith radio frame and the downlink subframes #4 713 and #7 714 of the (i+1)th radio frame are configured as flexible subframes of which flexible subframes 711 and 712 are used for uplink transmission. In this case, the UL grant or HARQ ACK/NACK in replay to the uplink transmission at the flexible subframe 711 and 712 is transmitted at the flexible subframes 713 and 714 of the (i+1)th radio frame. However, DL-UL switching occurs between the subframes #6 and #7 of the ith radio frame. Accordingly, the UE needs to secure the time for switching from the reception mode to the transmission mode. In order to accomplish this, K OFDM symbols at the beginning of the subframe #7 are used as the switching time while the rest OFDM symbols are used for uplink transmission. Here, K is informed through higher layer signaling or preset depending on the distance between UE and eNB.

4) In the TDD UL-DL configuration #5, it is assumed that the downlink subframes #3 721, #4 722, and #5 723 of the ith radio frame and the downlink subframe s#3 724, #4 725, and #7 726 of the (i+1)th radio frame are configured as flexible subframes of which the flexible subframes 721, 722, and 723 are used for uplink transmission. In this case, the UL grant or HARQ ACK/NACK as the reply to the uplink transmission at the flexible subframes 721, 722, and 723 is transmitted at the flexible subframes 724, 725, and 726 of the (i+1)th radio frame. Here, DL-UL switching occurs between the subframes #6 and #7 of the ith radio frame. Accordingly, the UE needs to secure the time for switching from the reception mode to the transmission mode. In order to accomplish this, K OFDM symbols at the beginning of the subframe #7 are used for the switching time, and the rest OFDM symbols for uplink transmission. At this time, K may be transmitted through a higher lay signaling or preset depending on the distance between the UE and the eNB.

FIG. 8 is a diagram illustrating TDD UL-DL configurations for use of the flexible subframes in uplink transmission and HARQ ACK/NACK corresponding to the uplink transmission according to the fifth embodiment of the present invention. Here, the description is directed to the Backward Compatible Carrier on which Rel. 8, 9, and 10 legacy UEs operate.

The legacy UE operating in TDD mode may receive synchronization signal at the 5th and 6th subframes of each radio frame. The eNB transmits the synchronization system at the 5th and 6th subframes on which the legacy UE operates. Accordingly, the 5th and 6th subframes are not allowed to be configured as flexible subframes on BCC, resulting in no use for uplink transmission. Meanwhile, since the irrelevant subframes has no resource defined for HARQ ACK/NACK, there is a need of a method for transmitting HARQ ACK/NACK without influence to the data reception of the Rel. 8, 9, and 10 legacy UEs. In order to accomplish this, it is proposed to introduce DCI format 3/3A and new PHICH-RNTI for transmitting HARQ ACK/NACK of a group of UEs.

As shown in FIG. 8, in each of the TDD UL-DL configurations #3, #4, and #5, the irrelevant subframes, with the exception of the subframes #5 801 and 805 and #6 802 and 806, are configured as flexible subframes. In FIG. 8, the subframes available for uplink transmission are marked with circles, and the subframes available for UL grant or HARQ ACK/NACK as the reply to the uplink transmission are marked with triangles. Among the subframes marked with the triangles, the subframe for transmitting UL or HARQ ACK/NACK as the reply to the uplink transmission at a specific subframe among the subframes marked with the circle is predetermined. Examples are as follows.

1) In the TDD UL-DL configuration #3, it is assumed that the downlink subframe #7 803 of the ith radio frame and the downlink subframe #7 807 of the (i+1)th radio frame are configured as flexible subframes of which the flexible subframe 803 is used for uplink transmission. In this case, the UL grant or HARQ ACK/NACK as the reply to the uplink transmission at the flexible subframe 803 is transmitted at the special subframe #1 804 of the (i+1)th radio frame. If retransmission is required, the flexible subframe #7 807 of the (i+1)th radio frame is used for uplink retransmission.

2) In the TDD UL-DL configuration #4, it is assumed that the downlink subframe #4 811 of the ith radio frame and the downlink subframes #4 815 and #7 816 of the (i+1)th radio frame are configured as flexible subframes of which the flexible subframes 811 and 812 are used for uplink transmission. In this case, the UL grant or HARQ ACK/NACK in replay to the uplink transmission at the flexible subframes 811 and 812 may be predetermined to be transmitted at the downlink subframe #0 and special subframe #1 814 of the (i+1)th radio frame. If retransmission is required, the flexible subframes #4 814 and #7 816 of the (i+1)th radio frame are used for uplink retransmission. However, DL-UL switching occurs between the subframes #6 and #7 in the ith radio frame, the UE needs to secure the time for switching from the reception mode to the transmission mode. In order to accomplish this, K OFDM symbols at the beginning of the subframe #7 are used for the switching time, and the rest OFDM symbols for uplink transmission. Here, K may be transmitted in a higher layer signal or predetermined depending on the distance between the eNB and the UE.

3) In the TDD UL-DL configuration #5, it is assumed that the downlink subframes #3 821, #4 822, and #7 823 of the ith radio frame and the downlink subframes #3 827 #4 828, and #7 829 of the (i+1)th radio frame are configured as flexible subframes of which the flexible subframes 821, 822, and 823 are used for uplink transmission. In this case, the UL grant or HARQ ACK/NACK in replay to the uplink transmission at the flexible subframe 821 is predetermined to be transmitted at the downlink subframe #9 824 of the ith radio frame. Also, the UL grant or HARQ ACK/NACK in replay to the uplink transmission at the flexible subframe 822 is predetermined to be transmitted at the downlink subframe #0 825 of the (i+1)th radio frame.

Next, the UL grant or HARQ ACK/NACK in replay to the uplink transmission at the flexible subframe 823 is predetermined to be transmitted at the special subframe #1 826 of the (i+1)th radio frame. It retransmission is required, the flexible subframes #3 827, #4 828, and #7 829 of the (i+1)th radio frame are used for uplink retransmission. At this time, since the DL-UL switching occurs between the subframes #6 and #7 of the ith radio frame, the UE needs to secure the time for switching from the reception mode to the transmission mode. In order to accomplish this, the K OFDM symbols at the beginning of the subframe #7 are sued for the switching time, and the rest OFDM symbols for uplink transmission. Here, K may be transmitted in a higher layer signal or predetermined depending on the distance between the UE and the eNB.

FIG. 9 is a diagram illustrating TDD UL-DL configurations for use of the flexible subframe in uplink transmission and HARQ ACK/NACK corresponding to the uplink transmission according to the sixth embodiment of the present invention. The description is directed to the Backward Compatible Carrier (BCC) on which the Rel. 8, 9, and 10 legacy UEs operate.

The legacy UE operating in TDD mode receives a synchronization signal at the 5th and 6th subframes of every radio frame. The eNB transmits the synchronization signal at the 5th and 6th subframes on the BCC on which the legacy UE operates. Accordingly, the 5th and 6th subframes are not allowed to be configured as flexible subframes on BCC, resulting in no use for uplink transmission. Also, there is no resource defined for HARQ ACK/NACK transmission in irrelevant subframes. Accordingly, there is a need of a method for transmitting HARQ ACK/NACK without influence to the data reception of the Rel. 8, 9, and 10 legacy UEs. In order to accomplish this, the present invention proposes a method for notifying the subframe for which the retransmission is requested using a specific bit of the UL grant in the subframe in which the legacy HARQ ACK/NACK timing is defined. This embodiment is directed to the case of using UL index included in the UL grant.

In the TDD UL-DL configurations #4 and #5 of FIG. 9, the irrelevant subframes, with the exception of the subframes #5 902 and 907 and #6 903 and 908, are configured as flexible subframes. In FIG. 9, the subframes available for uplink transmission are marked with circles, and the subframes available for UL grant or HARQ ACK/NACK transmission in replay to uplink transmission are marked with triangles.

1) In the TDD UL-DL configuration #4, the downlink subframe #4 of the ith radio frame is configured as flexible subframe and used for uplink transmission. In this case, the UL grant as the reply to the uplink transmission at the flexible subframe 901 may be transmitted at the downlink subframe #8 904 or #9 905 of the ith radio frame.

The UL grant transmitted at the downlink subframe #8 904 indicates uplink transmission at the uplink subframe #2 of the (i+1)th radio frame. Accordingly, if retransmission is required, the UE may identify the subframe for retransmission based on the UL index of the UL grant. For example, if the UL index is set to 00, the UE identifies that the UL grant indicates the uplink transmission at the uplink subframe #2 of the (i+1)th radio frame. If the UL index is set to 01, the UE identifies that the UL grant indicates the uplink subframe #4 906 of the (i+1)th radio frame for uplink transmission.

Since the UL grant of the downlink subframe #9 905 is of indicating the uplink transmission at the uplink subframe #3 of the (i+1)th radio frame, the UE may identify the subframe for retransmission based on the UL index of the UL grant. That is, if the UL index is set to 00, the UE may identify the uplink grant indicating the UL subframe #3 of the (i+1)th radio frame for uplink transmission. If the UL index is set to 01, the UE may identify the UL grant indicating the UL subframe #4 906 of the (i+1)th radio frame for retransmission.

2) In the TDD UL-DL configuration #5, it is assumed that the downlink subframes #3 911 and #4 912 of the ith radio frame are configured as flexible subframe and used for uplink transmission. In this case, the UL grant as the reply to the uplink transmission at the flexible subframes 911 and 912 is transmitted at the downlink subframe #8 913 of the ith radio frame. The UL grant at the downlink subframe #8 913 indicates the uplink transmission at the uplink subframe #2 of the (i+1)th radio frame. Accordingly, if retransmission is required, the UE may identify the subframe for retransmission based on the UL index of the UL grant.

For example, if the UL index is set to 00, the UE may identify the UL grant for uplink transmission at the uplink subframe #2 of the (i+1)th radio frame. If the UL index is set to 01, the UE may identify the UL grant for retransmission at the uplink subframe #2 914 of the (i+1)th radio frame. If the UL index is set to 10, the UE may identify the UL grant for retransmission at the uplink subframe #4 915 of the (i+1)th radio frame.

FIG. 10 is a diagram illustrating a TDD UL-DL configuration for use of the flexible subframes in uplink transmission and HARQ ACK/NACK corresponding to the uplink transmission according to the seventh embodiment of the present invention. Here, the description is directed to the Backward Compatible Carrier on which Rel. 8, 9, and 10 legacy UEs operate.

The legacy UE operating in TDD mode receives the synchronization signal at 5th and 6th subframes of every radio frame. This means that the eNB transmits the synchronization signal at the 5th and 6th subframes on the BCC on which the legacy UE operates. Accordingly, the 5th and 6th subframes are not allowed to be configured as flexible subframes on BCC, resulting in no use for uplink transmission. Meanwhile, since the irrelevant subframes has no resource defined for HARQ ACK/NACK transmission, there is a need of a method for transmitting HARQ ACK/NACK without influence to the data reception of the Rel. 8, 9, and 10 legacy UEs. In order to accomplish this, it is proposed to use the DCI format 3/3A and newly introduced PHICH-RNTI for HARQ ACK/NACK transmission of a group of UEs.

In the TDD UL-DL configuration #5 of FIG. 10, the irrelevant subframes, with the exception of the subframes #5 1003 and #6 1004, are configured as flexible subframes. The subframes available for uplink transmission and the subframes available for the UL grant or HARQ ACK/NACK as the reply to the uplink transmission are mapped to each other and marked with circles. In more detail, the subframes 1001 and 1005 and the subframes 1002 and 1006 are mapped to each other respectively and configured as flexible subframes.

1) In the TDD UL-DL configuration #5, it is assumed that the downlink subframes #3 1001 and #4 1002 are configured as flexible subframes and used for uplink transmission. In this case, the UL grant or HARQ ACK/NACK as the reply to the uplink transmission at the flexible subframes 1001 and 1002 is transmitted at the downlink subframes #7 1005 and #9 1006 of the ith radio frame. If retransmission is required, the subframe at the same position as the initial transmission in the (i+1)th radio frame is used for uplink retransmission.

FIG. 11 is a flowchart illustrating the eNB procedure of the method according to an embodiment of the present invention.

Referring to FIG. 11, the eNB configures the irrelevant subframes as flexible subframes at step 1101. Next, the eNB schedules UL grant at the flexible subframes at step 1102. Here, the downlink subframes available for UL grant transmission are identical with the subframes for HARQ ACK/NACK transmission. Next, the eNB receives uplink data as scheduled at the flexible subframes at step 1103. The eNB determines whether uplink data decoding succeeds at step 1104. If the uplink data decoding fails, the eNB transmits HARQ ACK/NACK or UL grant to request for retransmission of the uplink data at the subframes determined according to an embodiment of the present invention. Next, the eNB returns the procedure to step 1103.

FIG. 12 is a flowchart illustrating the UE procedure of the method according to an embodiment of the present invention.

Referring to FIG. 12, the UE determines whether the flexible subframes are used for uplink transmission at step 1201. The UE may receive the flexible subframe configuration information from the eNB prior to the start of this procedure. At this time, the UE may make the determination by checking whether the UL grant is received at the downlink subframe corresponding to the flexible subframe.

If it is determined that the flexible subframes are used for uplink transmission, the UE transmits uplink data at the flexible subframe corresponding to the received UL grant at step 1202. Next, the UE determines whether a message indicating the decoding success on the uplink data transmitted at the flexible subframe is received at the subframe determined according to an embodiment of the present invention at step 1203. If the uplink data decoding success message is not received, the UE returns the procedure to step 1202 to retransmit the uplink data.

Returning to step 1201, if it is determined that the flexible subframes are not used for uplink transmission, the UE receives downlink data as scheduled by the eNB at step 1204.

FIG. 13 is a block diagram illustrating a configuration of the eNB according to an embodiment of the present invention.

As shown in FIG. 13, the eNB comprises a controller 1301; a scheduler 1303; a transmitter including a PDCCH block 1305, a PDSCH block 1316, a PHICH block 1324, and a multiplexer 1315; and a receiver including a PUSCH block 1330, a PUCCH block 1339, and demultiplexer 1349.

The controller 1301 is responsible for configuring flexible subframes and notifies the scheduler 1303 and PDCCH block 1305 of the flexible subframes by referencing the channel information received from the UE and the data amount to be transmitted by the UE.

The PDCCH block 1305 of the transmitter (Tx) includes a DCI formatter 1307, a channel coder 1309, a rate matcher 1311, and a modulator 1313. The PDSCH block 1316 includes a data buffer 1317, a channel coder 1319, a rate matcher 1321, and a modulator 1323. The PHICH block 1324 includes an HARQ ACK/NACK generator 1325, a PHICH generator 1327, and a modulator 1329.

The PDCCH block 1305 formats DCI under the control of the scheduler 1303. The channel coder 1309 adds error correction capability to the DCI, and the rate matcher 1311 match the rate to the channel coded signal to the predetermined resource amount. The rate-matched DCI is modulated by the modulator 1313 and then multiplexed with other signals by the multiplexer 1315.

The PDSCH block 1316 reads out the data to be transmitted from the data buffer 1317, adds error correction code to the data by means of the channel coder 1319 matches the rate of the channel-coded signal to a predetermined size of resource by means of the rate matcher 1321, modulates the rate-matched signal by means of the modulator 1323, and multiplexes the modulated signal with other signals by means of the multiplexer 1315, under the control of the scheduler 1303.

The PHICH block 1324 generates HARQ ACK/NACK for PUSCH received from the UE by means of the HARQ ACK/NACK generator 1325 under the control of the controller 1303. The HARQ ACK/NACK is formatted suitable for the PHICH channel structure by the PHICH formatter 1327, modulated by the modulator 1329, and multiplexed with other signals by the multiplexer 1315.

The signals multiplexed by the multiplexer 1315 are generated into OFDM symbols to be transmitted at the subframes determined according to an embodiment of the present invention.

The PUSCH block 1330 of the receiver includes a modulator 1337, a derate matcher 1335, a channel decoder 1333, and a data acquirer 1331. The PUCCH block 1339 includes a demodulator 1347, a derate matcher 1345, a channel decoder 1343, and an uplink ACK/NACK or CQI acquirer 1341.

The PUSCH block 1330 separates PUSCH from the received signal by means of the demultiplexer 1349, demodulates the PUSCH by means of the demodulator 1337, performs derate matching on the symbols to the state before rate matching by means of the derate matcher 1335, decodes the derate-matched signal by means of the channel decoder 1333, and acquire PUSCH data by means of the data acquirer 1331. The data acquirer 1331 notifies the scheduler 1303 of the decoding result to adjust downlink HARQ ACK/NACK generation. The data acquirer 1331 also provides the controller 1301 with the decoding result. Through these processes, the control unit can transmit the downlink HARQ ACK/NACK at the subframes determined according to an embodiment of the present invention.

The PUCCH block 1330 separates PUCCH signal from the received signal by means of the demultiplexer 1349, demodulates the PUSCH signal by means of the demodulator 1347, decodes the demodulated signal by means of the channel decoder 1333, and acquires uplink ACK/NACK or CQI by means of the uplink ACK/NACK or CQI acquirer 1341. The acquired uplink ACK/NACK or CQI is provided to the scheduler 1303 so as to be used for determining whether to retransmit PUSCH and modulation and coding scheme (MCS).

The controller 1301 of the eNB transmits the scheduling information for PUSCH transmission at the downlink subframes corresponding to the flexible subframes determined according to an embodiment of the present invention. The controller 1301 controls the receiver to receive the uplink data from the UE at the flexible subframes according to the scheduling information. The controller 1301 also controls the transmitter to transmit the scheduling information or downlink ACK/NACK according to the received uplink data decoding result.

FIG. 14 is a block diagram illustrating a configuration of the UE according to an embodiment of the present invention.

As shown in FIG. 14, the UE comprises a controller 1401; a transmitter including a PUCCH block 1405, a PUSCH block 1416, and a multiplexer 1415; and a receiver including a PHICH block 1424, a PDSCH block 1430, a PDCCH block 1439, and a demultiplexer 1449.

The PUCCH block 1405 of the transmitter includes a UCI formatter 1407, a channel coder 1409, and a modulator 1413. The PUSCH block 1416 includes a data buffer 1418, a channel coder 1419, a rate matcher 1421, and a modulator 1423.

The PHICH block 1424 of the receiver includes an HARQ ACK/NACK acquirer 1425 and a modulator 1429. The PDSCH block 1430 includes a demodulator 1437, derate matcher 1435, a channel decoder 1433, and data acquirer 1431. The PDCCH block 1439 includes a demodulator 1447, a derate matcher 1445, a channel coder 1443, and a DCI acquirer 1441.

The controller 1401 determines whether the flexible subframes are used for uplink transmission by referencing the DCI received from the eNB and notifies the PUCCH block 1405, PUSCH block 1416, PHICH block 1424, PDSCH block 1430, and PDCCH block 1439 of the determination result to perform uplink transmission. The determination on whether the flexible subframes are used for uplink transmission and the uplink transmission at the flexible subframes are performed according to the method described above.

The PUCCH block 1405 generates HARQ ACK/NACK or CQI as Uplink Control Information (UCI) by means of the UCI formatter 1407 under the control of the scheduler 1401, adds an error correction code to the UCI by means of the channel coder 1409, and modulates the channel coded signal by means of the modulator 1413, and multiplexes the modulated signal with other signals by means of the multiplexer 1415.

The PUSCH block 1416 reads out the data to be transmitted from the data buffer 1418, adds the error correction code to the data by means of the channel coder 1419, matches the rate of the channel-coded signal to a predetermined size of resource by means of the rate matcher, and multiplexes the rate-matched signal with other signals by means of the multiplexer.

The multiplexed signals are transmitted to the eNB in the form of Single Carrier Frequency Division Multiple Access (SC-FDMA) signal.

The PHICH block 1424 of the receiver demultiplexes the signal received from the eNB by means of the multiplexer 1449 to extract PHICH, demodulates the PHICH by means of the demodulator 1429, and acquires HARQ ACK/NACK information from the PUSCH by means of the HARQ ACK/NACK acquirer 1425.

The PDSCH block 1430 demultiplexes the signal received from the eNB by means of the demultiplexer 1449 to extract PDSCH, demodulates the PDSCH by means of the demodulator 1437, recovers the symbols in the state before the rate matching by mans of the derate matcher 1435, decodes the derate-matched signal by means of the channel decoder 1433, and acquires PDSCH data by means of the data acquirer 1431. The data acquirer 1431 notifies the PUCCH block 1405 of the decoding result to adjust uplink HARQ ACK/NACK generation.

The PDCCH block 1439 demultiplexes the signal received form the eNB by means of the demultiplexer 1449 to extract PDCCH, demodulates the PDCCH by means of the demodulator 1447, decodes the demodulated signal by means of the channel decoder 1433, and acquires DCI by means of the DCI acquirer 1441.

The controller of the UE transmits to the eNB the uplink data at the flexible subframes configured for uplink transmission. The control unit 1401 determines whether the UL grant or HARQ ACK/NACK as the reply to the transmitted uplink data is received at the subframe determined according to an embodiment of the present invention. The control unit 1401 also may control the transmitter to perform retransmission of the uplink data at the flexible subframes determined according to an embodiment of the present invention.

As described above, the data transmission method of the present invention is capable of utilizing flexible subframes for uplink transmission without influencing the uplink HARQ process associated with the downlink subframes configured as flexible subframes.

Also, the data transmission method of the present invention is capable of transmitting HARQ ACK/NACK feedback corresponding to the uplink transmission when the flexible subframes are used for uplink transmission.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A data transmission method of a base station, comprising:
   transmitting information on a time division duplex (TDD) uplink (UL)-downlink (DL) configuration;
   identifying a plurality of subframes not configured for a first hybrid automatic repeat request (HARQ) process for uplink transmission according to the TDD UL-DL configuration;
   configuring a second HARQ process for uplink transmission using the plurality of subframes not configured for the first HARQ process for uplink transmission according to the TDD UL-DL configuration, wherein the plurality of subframes not configured for the first HARQ process includes subframes not configured for uplink data transmission according to the TDD UL-DL configuration, uplink grant transmission corresponding to the uplink data transmission according to the TDD UL-DL configuration and HARQ ACK/NACK transmission corresponding to the uplink data transmission according to the TDD UL-DL configuration; and
   transmitting, to a terminal, configuration information on the second HARQ process for uplink transmission,
   wherein the second HARQ process for uplink transmission comprises:
      configuring a subset of the plurality of subframes not configured for the first HARQ process as flexible subframes;
      transmitting, to the terminal, a first uplink grant for the terminal to transmit uplink data instructing the terminal to use the first uplink grant in a first subframe of the flexible subframes;
      receiving, from the terminal, the uplink data corresponding to the first uplink grant in the first subframe of the flexible subframes; and
      transmitting, if decoding of the uplink data fails, a second uplink grant in a second subframe of the plurality of subframes to request retransmission of the uplink data to the terminal,
   wherein the plurality of subframes includes only subframes of subframe number 0 and 5 for TDD UL-DL configuration 1, subframes of subframe number 0, 1, 4, 5, 6, and 9 for TDD UL-DL configuration 2, subframes of subframe number 1, 5, 6, and 7 for TDD UL-DL configuration 3, subframes of subframe number 0, 1, 4, 5, 6, and 7 for TDD UL-DL configuration 4, and subframes of subframe number 0, 1, 3, 4, 5, 6, 7, and 9 for TDD UL-DL configuration 5, and
   wherein the plurality of subframes are not configured for TDD UL-DL configuration 0 and TDD UL-DL configuration 6.

2. The data transmission method of claim 1, wherein the flexible subframes do not include subframes in which a synchronization signal is received.

3. The data transmission method of claim 1, wherein the second subframe is included in the flexible subframes.

4. The data transmission method of claim 1, wherein the second subframe is not included in the flexible subframes.

5. The data transmission method of claim 1, wherein the flexible subframes do not comprise subframes configured as an uplink subframe according to the TDD UL-DL configuration.

6. A data transmission method of a terminal, comprising:
receiving, from a base station, information on time division duplex (TDD) uplink (UL)-downlink (DL) configuration; and
receiving, from the base station, configuration information on a second hybrid automatic repeat request (HARQ) process for uplink transmission, wherein the second HARQ process for uplink transmission is configured using a plurality of subframes not configured for a first HARQ process for uplink transmission according to the TDD UL-DL configuration, and the plurality of subframes not configured for the first HARQ process includes subframes not configured for uplink data transmission according to the TDD UL-DL configuration, uplink grant transmission corresponding to the uplink data transmission according to the TDD UL-DL configuration and HARQ ACK/NACK transmission corresponding to the uplink data transmission according to the TDD UL-DL configuration,
wherein the second HARQ process for uplink transmission comprises:
receiving, from the base station, a first uplink grant for the terminal to transmit uplink data instructing the terminal to use the first uplink grant in a first subframe of flexible subframes, the flexible subframes are a subset of the plurality of subframes;
transmitting, to the base station, the uplink data corresponding to the first uplink grant in the first subframe of the flexible subframes;
receiving, from the base station, a second uplink grant according to a decoding result of the uplink data; and
retransmitting, if the second uplink grant includes information requesting retransmission of the uplink data, the uplink data to the base station in a second subframe of the flexible subframes,
wherein the plurality of subframes only includes subframes of subframe number 0 and 5 for TDD UL-DL configuration 1, subframes of subframe number 0, 1, 4, 5, 6, and 9 for TDD UL-DL configuration 2, subframes of subframe number 1, 5, 6, and 7 for TDD UL-DL configuration 3, subframes of subframe number 0, 1, 4, 5, 6, and 7 for TDD UL-DL configuration 4, and subframes of subframe number 0, 1, 3, 4, 5, 6, 7, and 9 for TDD UL-DL configuration 5, and
wherein the plurality of subframes are not configured for TDD UL-DL configuration 0 and TDD UL-DL configuration 6.

7. The data transmission method of claim 6, wherein a predetermined number of initial orthogonal frequency division multiplexing (OFDM) symbols in an uplink subframe adjacent to a downlink subframe are used as switching time.

8. The data transmission method of claim 6, wherein retransmitting of the uplink data is performed based on an uplink index.

9. A base station comprising:
a transceiver configured to transmit and receive signals to and from a terminal; and
a controller in communication with the transceiver, and configured to:
transmit information on time division duplex (TDD) uplink (UL)-downlink (DL) configuration,
identify a plurality of subframes not configured for a first hybrid automatic repeat request (HARQ) process for uplink transmission according to the TDD UL-DL configuration,
configure a second HARQ process for uplink transmission using the plurality of subframes not configured for the first HARQ process for uplink transmission according to the TDD UL-DL configuration, wherein the plurality of subframes not configured for the first HARQ process includes subframes not configured for uplink data transmission according to the TDD UL-DL configuration, uplink grant transmission corresponding to the uplink data transmission according to the TDD UL-DL configuration and HARQ ACK/NACK transmission corresponding to the uplink data transmission according to the TDD UL-DL configuration, and
transmit, to the terminal, configuration information on the second HARQ process for uplink transmission,
wherein the second HARQ process for uplink transmission comprises:
configuring a subset of the plurality of subframes not configured for the first HARQ process as flexible subframes,
transmitting a first uplink grant for the terminal to transmit uplink data instructing the terminal to use the first uplink grant in a first subframe of the flexible subframes to the terminal;
receiving uplink data corresponding to the first uplink grant in the first subframe of the flexible subframes from the terminal; and
transmitting, if decoding of the uplink data fails, a second uplink grant in a second subframe of the plurality of subframes to request retransmission of the uplink data to the terminal,
wherein the plurality of subframes includes only subframes of subframe number 0 and 5 for TDD UL-DL configuration 1, subframes of subframe number 0, 1, 4, 5, 6, and 9 for TDD UL-DL configuration 2, subframes of subframe number 1, 5, 6, and 7 for TDD UL-DL configuration 3, subframes of subframe number 0, 1, 4, 5, 6, and 7 for TDD UL-DL configuration 4, and subframes of subframe number 0, 1, 3, 4, 5, 6, 7, and 9 for TDD UL-DL configuration 5, and
wherein the plurality of subframes are not configured for TDD UL-DL configuration 0 and TDD UL-DL configuration 6.

10. The base station of claim 9, wherein the flexible subframes do not include subframes in which a synchronization signal is received.

11. The base station of claim 9, wherein the second subframe is included in the flexible subframes.

12. The base station of claim 9, wherein the second subframe is not included in the flexible subframes.

13. A terminal comprising:
a transceiver configured to transmit and receive signals to and from a base station; and
a controller in communication with the transceiver, and configured to:
receive, from the base station, information on time division duplex (TDD) uplink (UL)-downlink (DL) configuration, and
receive, from the base station, configuration information on a second hybrid automatic repeat request (HARQ) process for uplink transmission, wherein the second HARQ process for uplink transmission is configured using a plurality of subframes not configured for a first HARQ process the uplink transmission according to the TDD UL-DL configuration, and the plurality of subframes not configured for the first HARQ process includes subframes not configured for uplink data transmission according to the TDD UL-DL configuration, uplink grant transmission corresponding to the uplink data transmission according to the TDD UL-DL configuration and HARQ ACK/NACK transmission corresponding to the uplink data transmission according to the TDD UL-DL configuration,
wherein the second HARQ process for uplink transmission comprises:
receiving, from the base station, a first uplink grant for the terminal to transmit uplink data instructing the terminal to use the first uplink grant in a first subframe of flexible subframes, the flexible subframes are a subset of the plurality of subframes;
transmitting the uplink data corresponding to the first uplink grant in the first subframe of the flexible subframes to the base station;
receiving a second uplink grant according to a decoding result of the uplink data from the base station; and
retransmitting the uplink data in a second subframe of the flexible subframes to the base station if the second uplink grant includes information requesting retransmission of the uplink data,
wherein the plurality of subframes includes only subframes of subframe number 0 and 5 for TDD UL-DL configuration 1, subframes of subframe number 0, 1, 4, 5, 6, and 9 for TDD UL-DL configuration 2, subframes of subframe number 1, 5, 6, and 7 for TDD UL-DL configuration 3, subframes of subframe number 0, 1, 4, 5, 6, and 7 for TDD UL-DL configuration 4, and subframes of subframe number 0, 1, 3, 4, 5, 6, 7, and 9 for TDD UL-DL configuration 5, and
wherein the plurality of subframes are not configured for TDD UL-DL configuration 0 and TDD UL-DL configuration 6.

14. The terminal of claim 13, wherein a predetermined number of initial orthogonal frequency division multiplexing (OFDM) symbols in an uplink subframe adjacent to a downlink subframe are used as switching time.

15. The terminal of claim 13, wherein the controller determines whether to perform uplink retransmission based on an uplink index.

16. The method of claim 6, wherein the flexible subframes do not comprise subframes configured as an uplink subframe according to the TDD UL-DL configuration.

17. The base station of claim 9, wherein the flexible subframes do not comprise subframes configured as an uplink subframe according to the TDD UL-DL configuration.

18. The terminal of claim 13, wherein the flexible subframes do not comprise subframes configured as an uplink subframe according to the TDD UL-DL configuration.

* * * * *